United States Patent
Taga et al.

(10) Patent No.: US 6,672,052 B2
(45) Date of Patent: Jan. 6, 2004

(54) EXHAUST GAS PURIFYING APPARATUS FOR INTERNAL COMBUSTION ENGINE

(75) Inventors: Junichi Taga, Hiroshima (JP); Kazuya Yokota, Hiroshima (JP); Youichi Kuji, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 10/162,700

(22) Filed: Jun. 6, 2002

(65) Prior Publication Data

US 2003/0010020 A1 Jan. 16, 2003

(30) Foreign Application Priority Data

Jun. 7, 2001 (JP) ........................................ 2001-172168

(51) Int. Cl.[7] ................................................ F01N 3/00
(52) U.S. Cl. ............................ 60/285; 60/286; 60/295; 60/297; 123/430
(58) Field of Search ........................... 60/274, 285, 286, 60/295, 297, 301, 278, 277; 123/430, 431

(56) References Cited

U.S. PATENT DOCUMENTS

| | | | |
|---|---|---|---|
| 5,437,153 A | | 8/1995 | Takeshima et al. |
| 5,778,666 A | * | 7/1998 | Cullen et al. .................. 60/274 |
| 5,974,788 A | * | 11/1999 | Hepburn et al. ............... 60/274 |
| 6,173,571 B1 | * | 1/2001 | Kaneko et al. ................ 60/286 |
| 6,199,372 B1 | * | 3/2001 | Wakamoto .................... 60/274 |
| 6,233,925 B1 | * | 5/2001 | Hirota et al. .................. 60/285 |
| 6,378,297 B1 | * | 4/2002 | Ito et al. ....................... 60/284 |

* cited by examiner

*Primary Examiner*—Binh Tran
(74) *Attorney, Agent, or Firm*—Nixon Peabody LLP; Donald P. Studebaker

(57) ABSTRACT

An exhaust gas purifying apparatus comprises a control unit (29) operative to estimate an amount of NOx absorbed by a NOx trap material (17) disposed in an exhaust passage (10) and to make an air-fuel ratio richer so as thereby to cause the NOx trap material to release sulfur when the estimated amount of NOx absorption exceeds a specified amount. Further, the control unit (29) operative to estimate an amount of sulfur absorbed by the NOx trap material (17) and to make an air-fuel ratio richer and rising a temperature of exhaust gas so as thereby to cause the NOx trap material to release sulfur when the estimated amount of sulfur absorption exceeds a specified amount. The control unit restricts an air-fuel ratio from being made richer when the NOx trap material is not expected to absorb NOx due to progress of sulfur absorption resulting from conditionally the sulfur releasing.

14 Claims, 13 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and, more particularly, to an exhaust gas purifying apparatus containing a NOx trap material that is disposed in an exhaust line of an internal combustion engine.

2. Description of Related Art

Lean burn engines that are advantageous to improvement of fuel efficiency are typically provided with a NOx catalyst that is disposed in an exhaust passage. The NOx catalyst contains a NOx trap material that is comprised of barium as a chief material and absorbs NOx at a lean air-fuel ratio, i.e. in an oxygen excess atmosphere and reduction-purifies and releases the absorbed NOx into an exhaust gas at a rich air-fuel ratio i.e. in an oxygen-deficient atmosphere. In a well known NOx releasing control technique such as described in, for example, Japanese Patent No. 2586739, NOx is released from the NOx trap material by making an air-fuel ratio richer when an amount of NOx absorbed by the NOx trap material that is predicted on the basis of an engine speed and/or an engine load during lean burn operation of the engine becomes as small as the NOx catalyst lowers its NOx conversion efficiency below a predetermined limit value.

However, there is the problem of sulfur-poisoning the NOx trap material. Specifically, sulfuric components such as SOx contained in fuel that the NOx trap material absorbs hinder the NOx trap material in absorbing NOx and, in consequence, lowers the NOx conversion efficiency. On account of this problem, sulfur releasing control is introduced as is well known in the art. In one of sulfur components releasing control techniques that have been well known in the art, similar to the NOx releasing control technique, sulfur is released from the NOx trap material by making an air-fuel ratio richer when an amount of sulfur components absorbed by the NOx trap material that is predicted on the basis of an amount of fuel flow and/or a temperature of the catalyst becomes lower than a predetermined amount and causing a rise in exhaust gas temperature so as to cause a rise in catalyst temperature.

There is the problem of deterioration of fuel consumption performance in making an air-fuel ratio richer aiming at releasing NOx from the NOx trap material. This problem has an adverse influence on lean burn engines that are intended to improve fuel consumption performance. It is therefore desirable to alleviate a degree of enrichment of air-fuel ratio as small as possible even though the NOx trap material is caused to release NOx.

On the other hand, the rise in exhaust gas temperature that is caused aiming at releasing sulfur components is achieved by, for example, retarding an ignition timing. However, while an engine operating condition is in a range such as, for example, a low load region and a low speed region where an exhaust gas is at a low temperature on earth and is consequently hard to rise its temperature as high as effective for the NOx trap material in releasing sulfur components (which is over 550° C. to 600° C.) even though how retarding an ignition timing, the NOx trap material is hard to release effectively sulfur components. There occurs rather an evil of a fall of engine torque due to retarding an ignition timing. In such an event, therefore, it is usual to wait for engine operating condition shifting to a high load region and/or a high speed region by means of postponing releasing sulfur components.

Since sulfur is contained in fuel itself as was previously described, the NOx trap material basically continues to absorb sulfur components as far as the engine is running even while the NOx trap material postpones or restricts sulfur releasing. When the NOx trap material postpones or restricts sulfur releasing for an extremely long period of time, the NOx trap material absorbs sulfur components too much to count on absorption of NOx after all. That is, the NOx trap material becomes almost impossible to absorb NOx and, in consequence, there practically occurs an event where the NOx trap material has almost no NOx therein to release. If, in such an event, it is estimated that the amount of NOx absorption has exceeded a specified amount and, as a result, an air-fuel ratio is made richer with the aim of causing the NOx trap material to release NOx, the deterioration of fuel consumption performance grows into a more serious problem.

SUMMARY OF THE INVENTION

It is an object of the present invention to provide an exhaust gas purifying apparatus that restrains an air-fuel ratio from being made rich as far as possible so as thereby to prevent a growth of deterioration of fuel consumption performance.

The aforesaid object of the present invention is accomplished by an exhaust gas purifying apparatus for purifying exhaust gases generated by an internal combustion engine that comprises a NOx trap material that is disposed in an exhaust gas passage and operative to absorb NOx in an oxygen excess exhaust gas and release the absorbed NOx when a concentration of oxygen in an exhaust gas lowers and control means for estimating an amount of NOx absorbed by the NOx trap material, for making an air-fuel ratio richer so as thereby to cause the NOx trap material to release NOx when the amount of NOx absorbed by the NOx trap material is greater than a specified amount, for estimating an amount of sulfur absorbed by the NOx trap material, and for making an air-fuel ratio richer and rising an exhaust gas temperature so as thereby to cause the NOx trap material to release sulfur when the amount of sulfur absorbed by the NOx trap material is greater than a first specified amount.

The control means conditionally restricts the sulfur releasing of the NOx trap material and restrains an air-fuel ratio from being made richer when the amount of sulfur absorbed by the NOx trap material is larger than a second specified amount that is larger than the first specified amount.

According to the exhaust gas purifying apparatus, when the NOx trap material has almost no NOx therein to release due to progress of sulfur absorption, an air-fuel ratio is restrained from being made as rich as the NOx trap material releases NOx. In consequence, even if it is estimated that the amount of NOx absorbed by the NOx trap material has exceeded the specified amount and, as a result, the air-fuel ratio is restrained from being unnecessarily made richer, so that a growth of deterioration of fuel consumption performance is prevented.

The control means may reduces a lean engine operation region when the NOx trap material continues to absorb sulfur too much to count on absorption of NOx and, however, leaves a lean engine operation region where selective reduction-purification of NOx can be counted on as its is.

When the NOx trap material becomes almost impossible to absorb NOx resulting from progress of sulfur absorption, the lean engine operation region so as thereby to restrict lean engine operation that produces NOx significantly. This restrains an emission level of NOx into the atmosphere. Furthermore, the lean engine operation region where the selective reduction-purification of NOx can be counted is not reduced so as thereby to allow lean engine operation. This prevents deterioration of fuel consumption efficiency resulting from reducing the lean engine operation region while restraining an emission level of NOx into the atmosphere.

The lean engine operation region where the selective reduction-purification of NOx can be counted is an engine operation region where a temperature of exhaust gas is comparatively low.

In this instance, there is an overlap between the engine operation region where the selective reduction-purification of NOx is enabled and an engine operation region where the sulfur releasing that is caused by retarding anignition timing. Accordingly, the NOx trap material progressively absorbs sulfur resulting from restraining sulfur releasing, so as to selectively reduce and purify NOx and discharge the purified NOx into the atmosphere while the NOx trap material reduces an amount of NOx absorption according to the sulfur absorption. This is contributory to emission control during the restraint of sulfur releasing.

The control means may retard an ignition timing so as thereby to rise a temperature of exhaust gas and restricts the NOx trap material from releasing sulfur while the engine is in an operating state where the temperature of exhaust gas does not rise to a temperature effective on sulfur releasing even when retarding the ignition timing. In addition, the control means may judge desorption properties of sulfur absorbed by the NOx trap material and restrains the sulfur releasing when an amount of non-desorbing sulfur is larger than a specified amount.

In this instance, while the engine is in an operating state where the sulfur releasing is not effectively performed, the sulfur releasing is restrained so as to alleviate a drop in engine output torque due to retardation of the ignition timing. Furthermore, a large part of sulfur absorbed in the NOx trap material is unable to desorb, the sulfur releasing is restrained so as to inhibit useless sulfur releasing, i.e. to prevent unnecessarily making an air-fuel ratio richer and rising a temperature of exhaust gas.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

Figure 1:
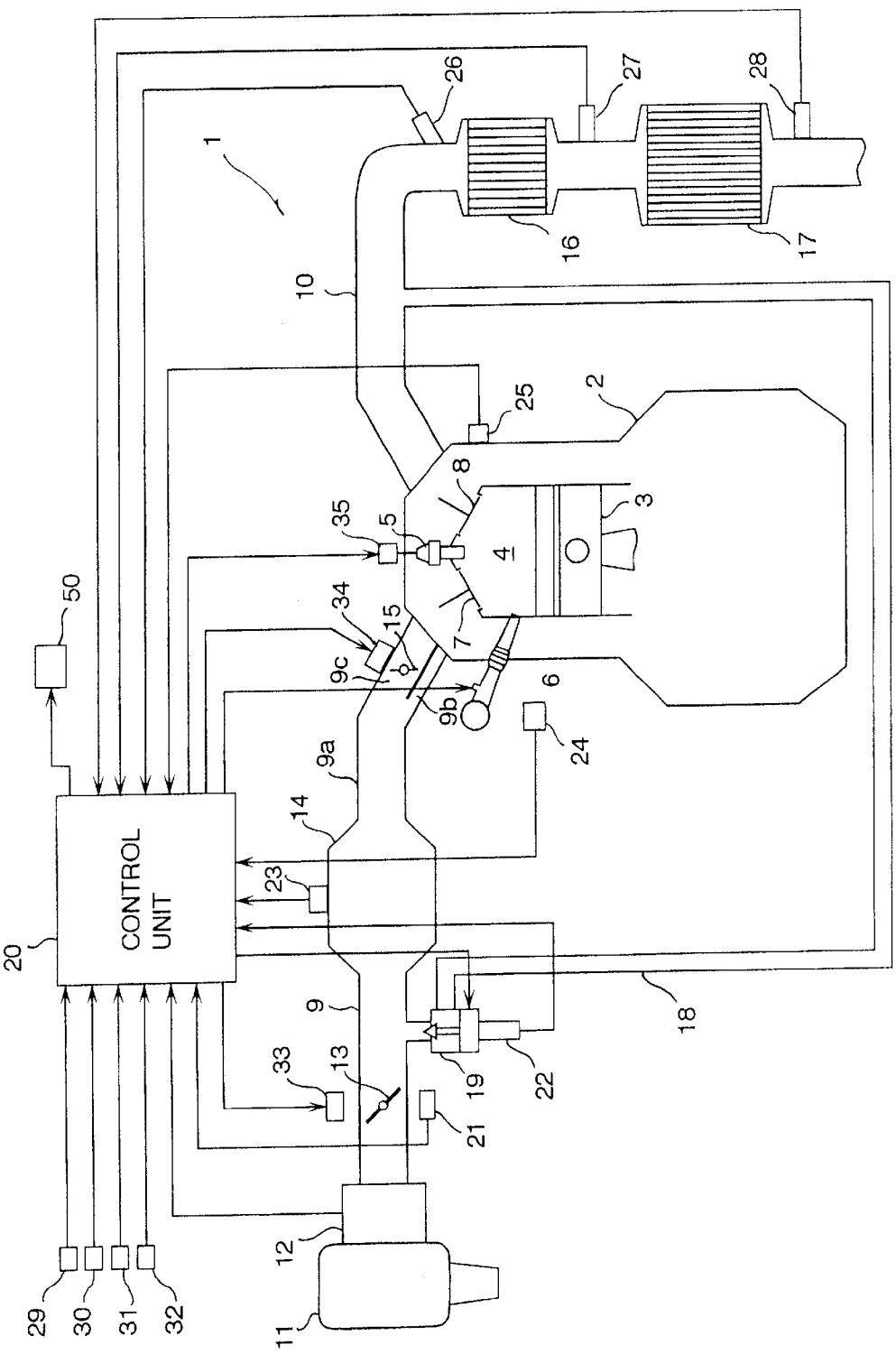
FIG. 1 is a view showing a apparatus configuration of an engine control apparatus including an exhaust gas purifying apparatus according to an embodiment of the present invention.

Referring to the drawings in detail and, in particular, to FIG. 1 showing an exhaust gas purifying apparatus according to an embodiment of the present invention that is installed to an engine 1 such as a multi-cylinder internal combustion engine, that has an engine body 2 having a plurality of combustion chambers 4 (only one of which is depicted) that are formed by pistons 3, respectively. The engine 1 is provided for each combustion chamber 4 with an ignition plug 5 dispose at a top of the combustion chamber 4 and a fuel injector 6 disposed at a side of the combustion chamber 4 so as to spray fuel directly into the combustion chamber 4.

Intake air is introduced into the combustion chamber 4 through an intake passage 9 leading to two intake ports that are opened and closed at appropriate timings by intake valves 7, respectively. The intake passage is provided, in order from an upstream end, with an air cleaner 11, an airflow sensor 12, a throttle valve 13 and a surge tank 14. The intake passage 9 downstream from the surge tank 14 branches off to a plurality of discrete intake passages 9a. Each discrete passage 9a is divided into two parts and leads to the respective intake ports, respectively. When one of the intake valve 7, namely a swirl generating intake valve, closes the intake port 9c, there is generated a swirl in the combustion chamber 4 by intake air passing through another intake port 9b and admitted by the intake valve 7.

Exhaust gas is discharged into an exhaust passage 10 from the combustion chamber 4 through exhaust valves 8. The exhaust passage 10 is provided with two catalysts, namely a three-way catalyst 16 and a NOx catalyst 17 in order from the upstream end. The three-way catalyst 16 reduces CO, HC and NOx in an exhaust gas while an air-fuel ratio is approximately 14.7 (stoichiometric air-fuel ratio). The NOx catalyst 17 contains barium as a chief component and a NOx trap material carrying a metal selected from an alkaline metal such as potassium, magnesium, strontium and lanthanum, alkaline earth metal, or rear earth metal and a noble metal such as platinum operative as a catalytic action element. The NOx catalyst 17 absorbs NOx in an exhaust gas having passed through the three-way catalyst 16 to lower an emission level of NOx into the atmosphere while the air-fuel ratio is lean and releases absorbed NOx into the exhaust gas so as to let the NOx react with CO and HC for reduction purifying NOx while an air-fuel ratio is rich.

There is provided an exhaust gas recirculation passage 18 connected between the exhaust passage 10 upstream of the three-way catalyst 16 and the intake passage 8 upstream of the surge tank 14. The exhaust gas recirculation passage 18 is provided with an exhaust gas recirculation valve 19 for controlling the amount of exhaust gas that is admitted into an intake air stream.

An engine control unit 20 receives various signals representative of an engine operating condition and the like from sensors 12 and 21–32. Specifically, The airflow sensor 12 operates to detect an amount of intake air and provides a signal representative of the airflow rate. A throttle opening sensor 21 operates to detect an opening or position of the throttle valve 13 and provides a signal representative of the opening or position. A valve opening sensor 22 operates to detect an opening or position of the exhaust gas recirculation valve 19 and provides a signal representative of the opening or position. A boost pressure sensor 23 operates to detect a negative intake pressure in the surge tank 14 and provides a signal representative of the negative intake pressure. A fuel pressure sensor 24 operates to detect a fuel pressure at which fuel is delivered to the fuel injector 6 and provides a signal representative of the fuel pressure. A water temperature sensor 25 operates to detect a temperature of cooling water in the engine body 2 and provides a signal representative of the cooling water temperature. A first oxygen sensor ($O_2$ sensor) 26 operates to detect a concentration of oxygen in an exhaust gas before flowing into the three-way catalyst 16 and provides a signal representative of the concentration of oxygen based on which an air-fuel mixture burned in the combustion chamber 4 is judged whether the air-fuel mixture was richer or leaner than a stoichiometric mixture. A gas temperature sensor 27 operates to detect an inlet temperature of an exhaust gas that flows into the NOx catalyst 17 and provides a signal representative of the inlet gas temperature. A second oxygen sensor ($O_2$ sensor) 28 operates to detect a concentration of oxygen in an exhaust gas coming out of the NOx catalyst 17 and provides a signal representative of the concentration of oxygen based on which an air-fuel ratio is estimated. A speed sensor 29 operates to detect a rotational speed of engine and provides a signal representative of the engine speed inlet. A position sensor 30 operates to detect a position of accelerator pedal (not shown) and provides a signal representative of the accelerator position. A temperature sensor 31 operates to detect a temperature of intake air and provides a signal representative of the intake air temperature. A pressure sensor 32 operates to detect an atmospheric pressure and provides a signal representative of the atmospheric pressure. The engine control unit 20 provides various operative elements with control signals according to incoming signals representative of an engine operating condition of the engine 1. The operating elements include at least an actuator 33 operative to actuate the throttle valve 13, an actuator 34 operative to actuate the swirl valve 15 and an ignition circuit 35 operative to excite the ignition plug 5 in addition to the fuel injector 6 and the exhaust gas recirculation valve 19. The engine control unit 20 performs NOx purge control for purging NOx absorbed by the NOx trap material from the NOx catalyst 17 and sulfur poisoning removal control for releasing sulfur adsorbed by the NOx trap material from the NOx catalyst 17 in addition to various control of at least throttle opening, an amount of exhaust gas recirculation, an amount of fuel injection, a fuel injection timing, swirl generation and ignition timing.

Figure 2:
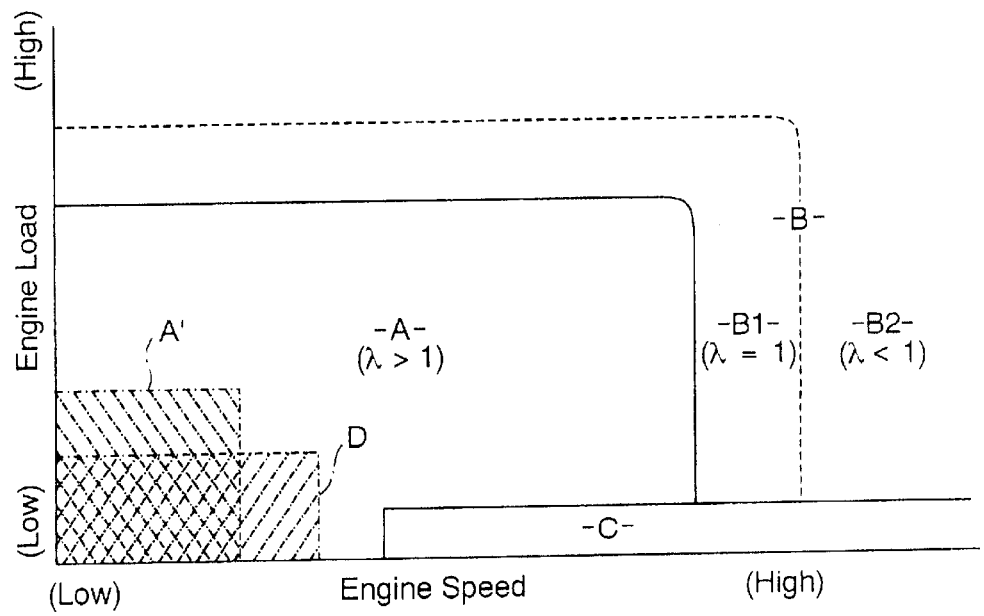
FIG. 2 is an illustration of an air-fuel ratio control map.

FIG. 2 shows an air-fuel ratio control map which defines engine operating regions, namely a lean operation region A allotted for moderate driving conditions with moderate engine speeds and moderate engine loads, a rich operation region B1 allotted for high speed driving conditions or accelerative driving conditions with high engine speeds and/or high engine loads, a stoichiometric operation region B2 allotted for driving conditions between moderate driving conditions and high speed or accelerative driving condition, and a fuel cut region C allotted for driving conditions with moderate to high engine speeds and low engine loads. The air-fuel ratio ($\lambda$) is controlled with reference to the air-fuel ratio control map so as to be higher than a stoichiometric air-fuel ratio ($\lambda=1$) in the lean operating region A that is allotted for moderate engine speeds and moderate engine loads, to be lower than the stoichiometric air-fuel ratio ($\lambda=1$) in the rich operating region B1 and to be equal to the stoichiometric air-fuel ratio ($\lambda=1$) in the stoichiometric operating region B2. In the fuel cut operating region C, fuel supply to the combustion chamber 4 is restricted.

While the engine 1 operates with a lean air-fuel ratio ($\lambda>1$) in the lean operating region A, the control unit 20 performs later fuel injection (that is referred to fuel injection made during a compression stroke) so as to concentrate fuel locally around the ignition plug 5, thereby causing stratified charge combustion. The lean engine operation causes the NOx catalyst 17 to absorb NOx in an exhaust gas. This leads to improvement of fuel consumption performance and emission performance. While the engine 1 operates in a rich air-fuel ratio ($\lambda<1$) in the rich operating region B1, the control unit 20 performs early fuel injection (that is referred to fuel injection made during an intake stroke) so as to provide sufficiently vaporized and atomized fuel charge in the combustion chamber 4. The rich engine operation causes oxidation-reduction reaction of absorbed NOx with CO and HC in an exhaust gas. This leads to good output torque and improvement of emission performance. While the engine 1 operates in the stoichiometric air-fuel ratio ($\lambda=1$), the control unit 20 performs the early fuel injection likely during the rich engine operation so as to provide sufficiently vaporized and atomized fuel charge in the combustion chamber 4. The stoichiometric engine operation causes the three-way catalyst 16 to purify NOx, CO and HC in an exhaust gas all together.

The lean operation region A is reduced in extent to a narrow region (reduced lean operation region) A' that is established for lower engine speeds and lower engine loads and used in, for example, the event where the NOx has absorbed NOx as much as it can not be expected to absorb NOx any more. As a result, the rich operation region B (that is hereafter referred to a total region of both rich operation region B1 and stoichiometric operation region B2) is extended towards lower engine speed and lower engine load. The reduction of the lean operation region A restricts the lean engine operation itself in which a large amount of NOx is produced, resulting in restricting an emission level of NOx into the atmosphere when the NOx trap material encounters deterioration of NOx absorbing capacity.

However, in that event, a selective reduction-purification region D, that is allotted for lower engine speeds and lower engine loads, is excluded from the target of restriction for the lean engine operation. That is, NOx trap material can be expected to perform the effect of selective reduction-purification of NOx in the selective reduction-purification region D where the temperature of exhaust gas is comparatively low. This selective reduction-purification of NOx is referred to the effect that the NOx trap material selectively reduction-purifies some amount of NOx and is categorized differently from the effect of absorbing, reducing and releasing NOx as described above. Accordingly, since the NOx trap material remains performing the selective reduction-purification of NOx in the selective reduction-purification region D despite of that the NOx trap material can not be expected to absorb NOx due to an advance of absorbing NOx, the lean engine operation is exceptionally permitted in the selective reduction-purification region D even in engine operating condition meeting the restriction of lean engine operation in order to leave the NOx trap material to absorb NOx. As a result, the deterioration of fuel consumption performance due to the reduction in the lean operation region A while an emission level of NOx into the atmosphere is lowered.

Figure 3:
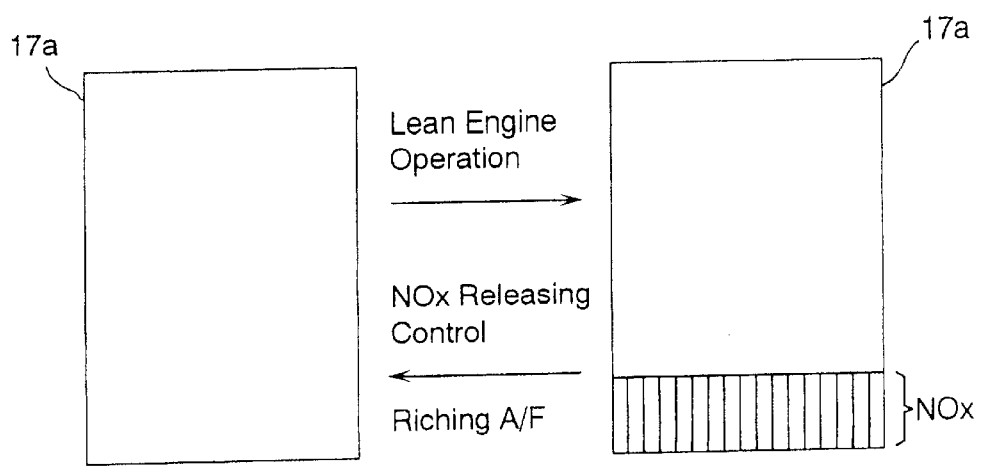
FIG. 3 is a conceptual chart showing a NOx trap material that releases NOx in NOx releasing control.

FIG. 3 is a conceptual view showing the NOx releasing control. As shown, when the amount of NOx absorbed by the NOx trap material 17a increases beyond a specified amount resulting from lean engine operation in the lean operation region A, the NOx trap material 17a is made to recover its NOx absorbing capacity by making the air-fuel ratio of an exhaust gas richer than at least an air-fuel ratio during the lean engine operation, for example, equal to or richer than the stoichiometric air-fuel ratio. However, since making an air-fuel ratio richer causes deterioration of fuel consumption performance and, in consequence, spoils the fuel consumption performance increasing characteristic of lean burn engine, it is desirable to restrict the degree of enrichment of air-fuel ratio richer even for the purpose of releasing NOx from the NOx trap material 17a.

In this instance, an air-fuel ratio can be changed by changing an amount of fuel injection and a timing of fuel injection. When making an air-fuel ratio leaner, the fuel injection is timed in a compression stroke while the amount of fuel injection is reduced. On the other hand, when making an air-fuel ratio richer, the fuel injection is timed in an intake stroke while the amount of fuel injection is increased.

Figure 4:
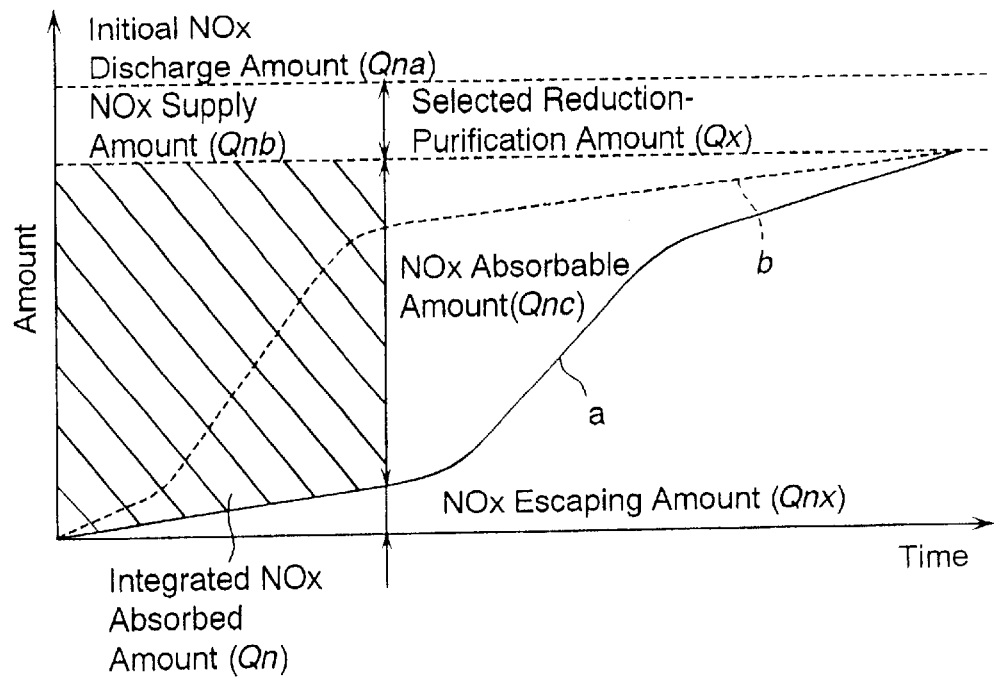
FIG. 4 is a time chart of a change in NOx escaping amount with respect to time.

FIG. 4 is a time chart showing a change in the amount of NOx possibly passing through the NOx catalyst 17 with time during lean engine operation. As shown, during lean engine operation, the amount of NOx Qnc (instantaneous value) that the NOx catalyst 17 can absorb NOx per unit time (which is hereafter referred to as the instantaneous NOx absorbing amount) decreases with time and, on the other hand, the amount Qnx that the NOx catalyst 17 lets NOx escape therefrom (which is hereafter referred to as the NOx escaping amount) increases with time. Letting Qna, x and Qx be the initial NOx discharge amount of NOx in an exhaust gas that is discharged from the combustion chambers 4 for the first time, the selective reduction-purification capacity with which the NOx catalyst 17 can perform the selective reduction-purification of NOx, and the selective reduction-purification amount of NOx that the NOx catalyst 17 can reduction-purify NOx, respectively, the NOx supply amount Qnb that is the amount of NOx supplied to the NOx catalyst 17 is given as a difference of the initial NOx discharge amount Qna from the selective reduction-purification amount Qx. Accordingly, the NOx escaping amount Qnx is given as a difference of the NOx supply amount Qnb from the instantaneous NOx absorbable amount Qnc.

Characteristic curves a and b indicate changes in the NOx escaping amount Qnx with time. The characteristic curve a is applied to comparatively low temperature of an exhaust gas, and hence of the NOx catalyst 17, and the characteristic curve b is applied to comparatively high temperature of an exhaust gas, and hence of the NOx catalyst 17. The integrated NOx absorbed amount Qn that is the amount of NOx having been absorbed by the NOx catalyst 17 is expressed by an area between the characteristic curve a or b and the line indicating the NOx supply amount Qnb. Shown as a shaded area by way of illustration in FIG. 4 is the integrated NOx absorbed amount Qn in the case where the temperature of exhaust gas is comparatively low. The instantaneous NOx absorbable amount Qnc higher over a wide range when the temperature of exhaust gas is comparatively low than the temperature of exhaust gas is comparatively high. In addition, the integrated NOx absorbed amount Qn increases earlier when the temperature of exhaust gas is comparatively low than the temperature of exhaust gas is comparatively high. This indicates that the NOx catalyst 17 keeps a high level of purification capacity for a long time when the temperature of exhaust gas is comparatively low.

Figure 5:
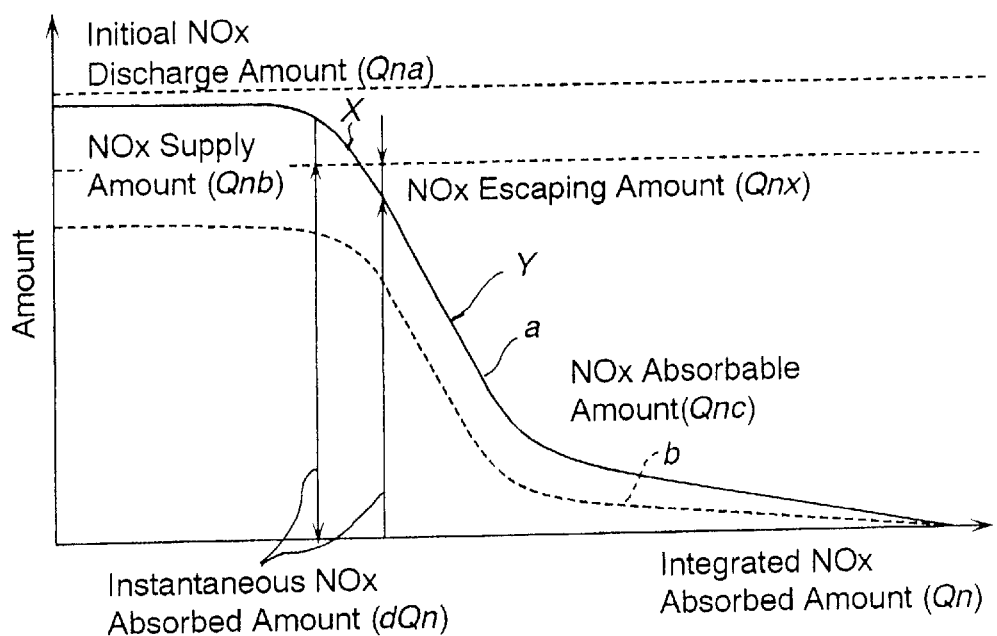
FIG. 5 is a time chart of a change in NOx absorbable amount with respect to NOx absorbed amount.

FIG. 5 shows a characteristic curve of instantaneous NOx absorbable amount Qnc with respect to integrated NOx absorbed amount Qn. As shown, the larger the instantaneous NOx absorbable amount Qnc is, the smaller the integrated NOx absorbed amount Qn is. That is, the larger the instantaneous NOx absorbable amount Qnc itself is, the smaller an increasing rate of the instantaneous NOx absorbable amount Qnc per unit time is. However, though the integrated NOx absorbed amount Qn is an integrated value of instantaneous NOx absorbed amounts dQn, the instantaneous NOx absorbed amount Qnc is not always employed for the instantaneous NOx absorbed amount dQn. As shown by a reference X, since, when the NOx supply amount Qnb is larger than the instantaneous NOx absorbable amount Qnc, NOx supplied to the NOx catalyst 17 can be entirely absorbed by the NOx catalyst 17, the NOx supply amount Qnb is employed for the instantaneous NOx absorbed amount dQn. To the contrary, as shown by a reference Y, since, when the instantaneous NOx absorbable amount Qnc is smaller than the NOx supply amount Qnb, NOx supplied to the NOx catalyst 17 is partly absorbed by the NOx catalyst 17 and partly passes through the NOx catalyst 17, the instantaneous NOx absorbable amount Qnc is employed for the instantaneous NOx absorbed amount dQn. That is, either one of the NOx supply amount Qnb and the instantaneous NOx absorbable amount Qnc that is smaller than the other is employed for the instantaneous NOx absorbed amount dQn.

When the instantaneous NOx absorbable amount Qnc is employed for the instantaneous NOx absorbed amount dQn, the instantaneous NOx absorbed amount dQn becomes smaller as the instantaneous NOx absorbable amount Qnc becomes larger. Further, the instantaneous NOx absorbable amount Qnc is corrected according to an exhaust gas temperature or a NOx catalyst temperature, a NOx supply amount Qnb, and the like. The accuracy of estimate of the integrated NOx absorbed amount Qn can be improved by taking these dependence tendencies into consideration.

Figure 6:
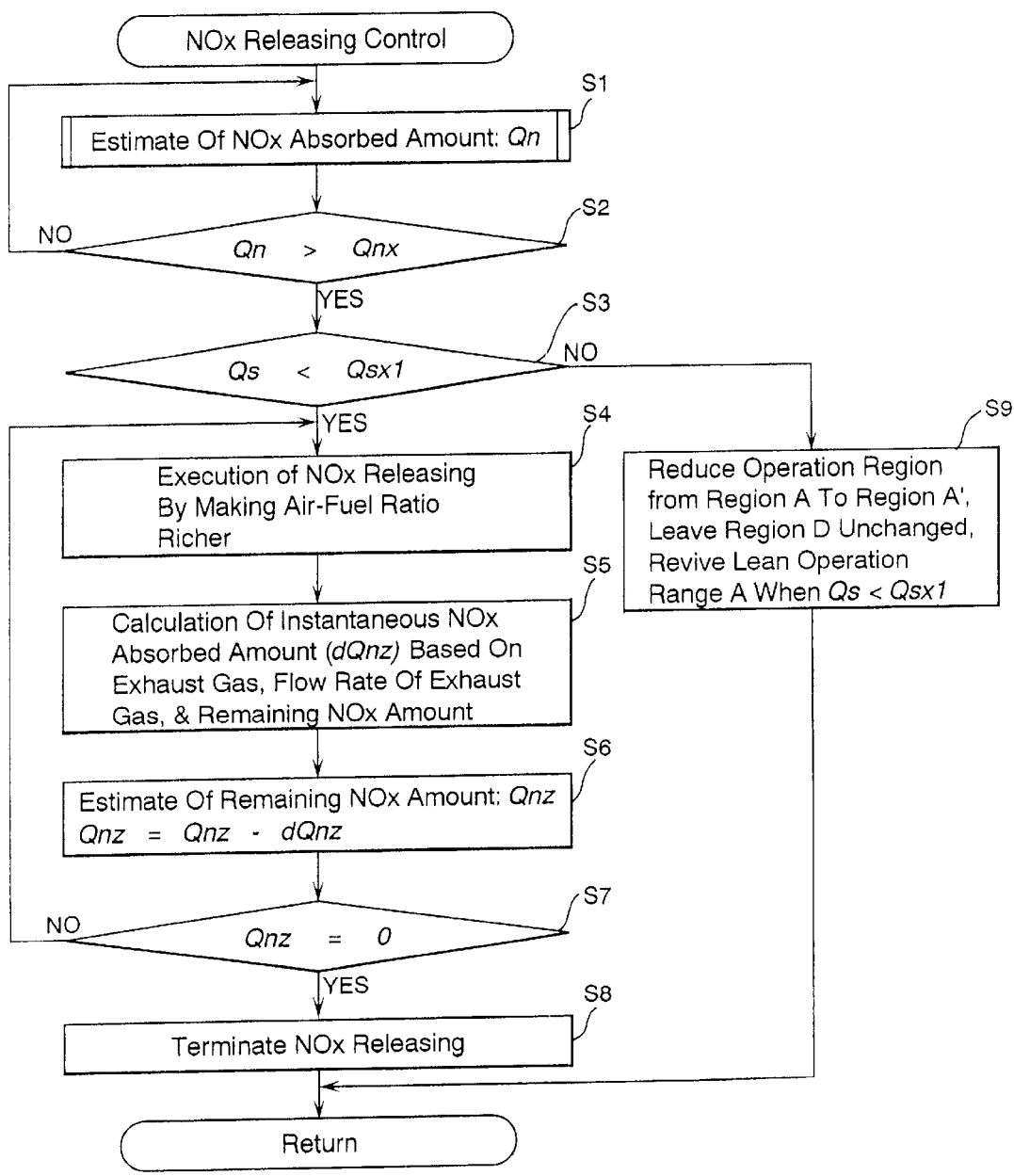
FIG. 6 is a flowchart illustrating a sequence routine of NOx releasing control.

FIG. 6 is a flowchart illustrating a main routine of the NOx releasing control that is continuously repeated at predetermined periods while the engine 1 is within the lean operating region where the NOx trap material is in surroundings for absorbing NOx. Because, while NOx is released spontaneously from the NOx trap material during the lean engine operation, an estimate of an amount of NOx remaining stored or unreleased in the NOx trap material (which is hereafter referred to as the NOx remaining amount) is made on the basis of an amount of NOx released from the NOx trap material in place of the estimate of integrated NOx absorbed amount Qn in the NOx releasing control. Further, because NOx is also released resulting from sulfur releasing that is caused by making an air-fuel ratio richer and rising exhaust gas temperature during sulfur releasing control (which that will be described later), the estimate of a NOx remaining amount in the NOx trap material is made in place of the estimate of integrated NOx absorbed amount Qn during sulfur releasing.

Specifically, when the sequence logic commences and control proceeds to a functional block at step S1 where a subroutine of an estimate of integrated NOx absorbed amount Qn is called for.

Figure 7:
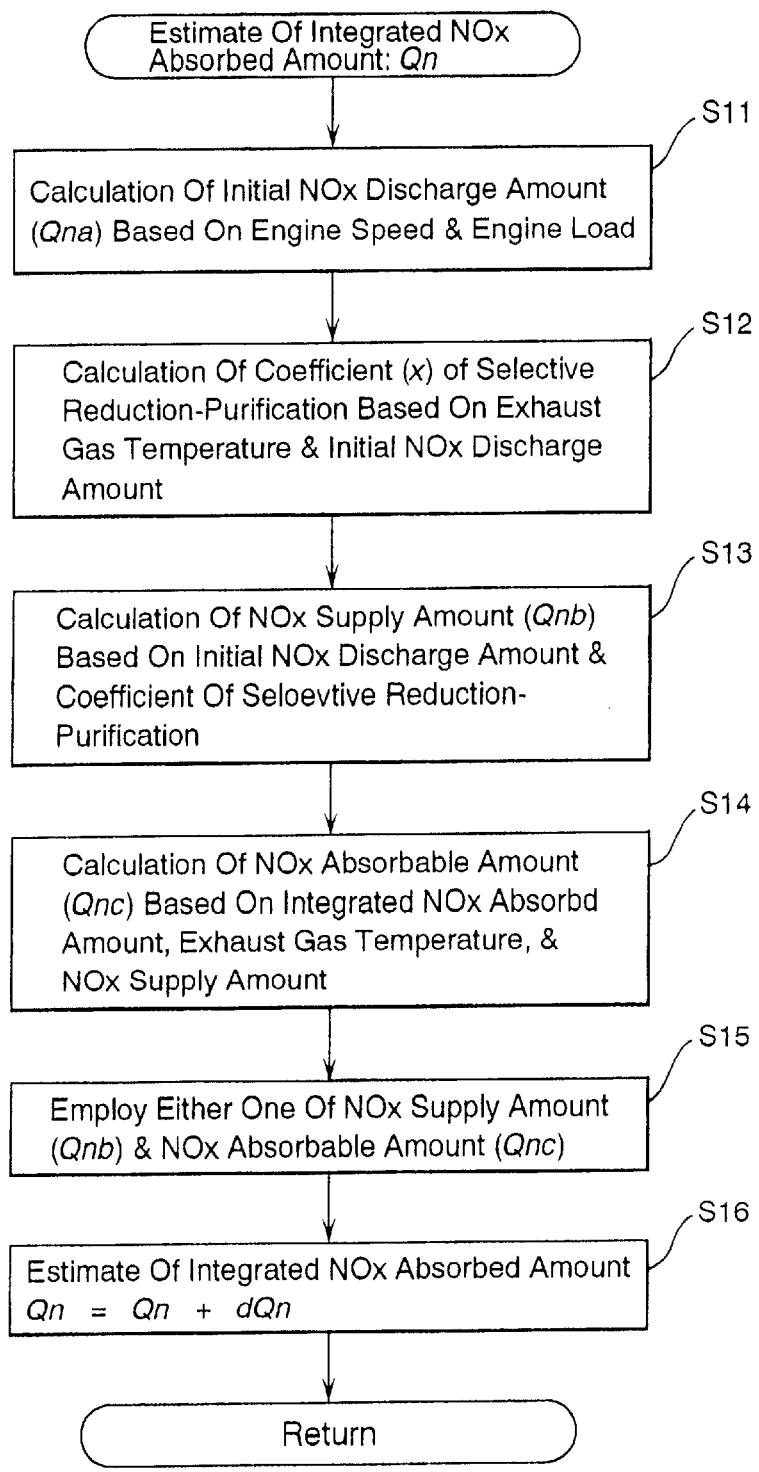
FIG. 7 is a flowchart illustrating a sequence routine of estimating a NOx absorbed amount.

FIG. 7 is a flowchart illustrating a subroutine of the estimate of integrated NOx absorbed amount Qn. When the sequence logic commences and control proceeds to a block at step S11 where a calculation of an initial NOx discharge amount Qna is made on the basis of an engine speed and an engine load. The initial NOx discharge amount Qna becomes larger with an increase in engine speed and/or engine load. Subsequently, at step S12, a calculation of a selective reduction-purification efficiency x is made on the basis of an exhaust gas temperature and the initial NOx discharge amount Qna. The selective reduction-purification efficiency x becomes higher with an increase in exhaust gas temperature and/or initial NOx discharge amount Qna. A calculation of a NOx supply amount Qnb is further made on the basis of the initial NOx discharge amount Qna and the selective reduction-purification efficiency x at step S13. This calculation is achieved by subtracting the selective reduction-purification amount Qx (Qx=Qna×x) from the initial NOx discharge amount Qna. Subsequently, a calculation of an instantaneous NOx absorbable amount Qnc is made on the basis of the previous integrated NOx absorbed amount Qn (the integrated amount of NOx that has been absorbed until the last sequence cycle), the NOx supply amount Qnb at step S14. The instantaneous NOx absorbable amount Qnc becomes higher with an increase in the integrated NOx absorbed amount Qn, an increase in the exhaust gas temperature and/or a decrease in the NOx supply amount Qnb. After employing either one of the NOx supply amount Qnb and the instantaneous NOx absorbable amount Qnc that is smaller than the other for the instantaneous NOx absorbed amount dQn at step S15, an estimate of integrated NOx absorbed amount Qn is made by adding the instantaneous NOx absorbed amount dQn to the previous integrated NOx absorbed amount Qn at step S16.

Referring back to FIG. 6, a judgment is made at step S2 as to whether the integrated NOx absorbed amount Qn is greater than a judging value Qnx for execution of NOx releasing. In this instance, the judging value Qnx is established to a value for preventing the NOx catalyst 17 from maintaining its NOx conversion efficiency higher than a limit value. After waiting a turn of the answer to affirmative, another judgment is made at step S3 as to whether a total amount of sulfur absorbed by the NOx trap material (which is hereafter referred to as a sulfur absorbed amount) Qs, that is estimated in the sulfur releasing control (which will be described later), is smaller than a first effective judging value Qsx1 (see FIG. 13) for a start of NOx releasing. When the sulfur absorbed amount Qs is smaller than the first effective judging value Qsx1, NOx is released from the NOx trap material by making an air-fuel ratio richer and purified at step S4.

Subsequently, a calculation of an instantaneous amount of NOx released from the NOx trap material (that is hereafter referred to an instantaneous NOx released amount) dQnz is made on the basis of the air-fuel ratio and the amount of NOx remaining unreleased or still absorbed in the NOx trap material (that is hereafter referred to as a remaining NOx absorbed amount) Qnz, i.e. the amount of NOx after taking away a total amount of NOx having been released until the last sequence cycle. The instantaneous NOx released amount dQnz becomes higher with an increase in the exhaust gas temperature, an increase in the air-fuel ratio and/or an increase in the instantaneous NOx released amount dQnz.

Subsequently, after estimating a present remaining NOx absorbed amount Qnz by subtracting the instantaneous NOx released amount dQnz from the previous remaining NOx absorbed amount Qnz at step S6, a judgment is made at step S7a to whether the remaining NOx absorbed amount Qnz is zero. When the remaining NOx absorbed amount Qnz is not zero, after waiting till the remaining NOx absorbed amount Qnz becomes zero, the NOx release from the NOx trap material is terminated at step S8.

On the other hand, when the sulfur absorbed amount Qs is larger than the first effective judging value Qsx1 at step S3, the sequence logic proceeds to step S9 where the lean operation region A is replaced with the reduced lean operation region A' established for lower engine speeds and lower engine loads. In this event, the selective reduction-purification region D is left as it is. When the sulfur absorbed amount Qs becomes smaller than the first effective judging value Qsx1 at step S3, the lean operation region A is retrieved. At this time, an alarm 50 (see FIG. 1) that is installed in, for example, an instrument panel (not shown) is actuated so as to provide the driver with an alarm indicating that the NOx trap material has lost the NOx conversion capacity.

In the NOx releasing control, NOx releasing may be started in the event where the instantaneous NOx absorbable amount Qnc becomes smaller than a specified value (i.e. where the NOx escaping amount Qnx increases beyond a specified value) in place of or in addition to the event where the integrated NOx absorbed amount Qn becomes greater than the judging value Qnx. That is, as was previously described, the instantaneous NOx absorbable amount Qnc remains large over a long period of time and the integrated NOx absorbed amount Qn becomes large earlier resulting from that the NOx catalyst 17 keeps a higher level of purification capacity, for example, when the temperature of exhaust gas is comparatively low than when the temperature of exhaust gas is comparatively high. In consequence, when making a judgment as to starting NOx releasing on the basis of only an integrated NOx absorbed amount Qn, the NOx catalyst 17 starts NOx releasing hastily even while the purification capacity of the NOx catalyst 17 still remains high (the NOx catalyst 17 still has a large instantaneous NOx absorbable amount Qnc) and, on the other hand, the NOx catalyst 17 is a long time in starting NOx releasing when the purification capacity of the NOx catalyst 17 has already fallen (the NOx catalyst 17 has a small instantaneous NOx absorbable amount Qnc). As this is obviously irrational, it is preferable to start NOx releasing not only when an integrated NOx absorbed amount Qn has become greater beyond the judging value Qnx for a start of NOx releasing but also when an NOx escaping amount Qnx increases beyond the specified value resulting from that instantaneous NOx absorbable amount Qnc has become smaller beyond a specified value regardless of the condition for the judgment of a start of NOx releasing. This prevents a rise in the amount of NOx that passes through the NOx catalyst 17 and is emitted into the atmosphere.

Figure 8:
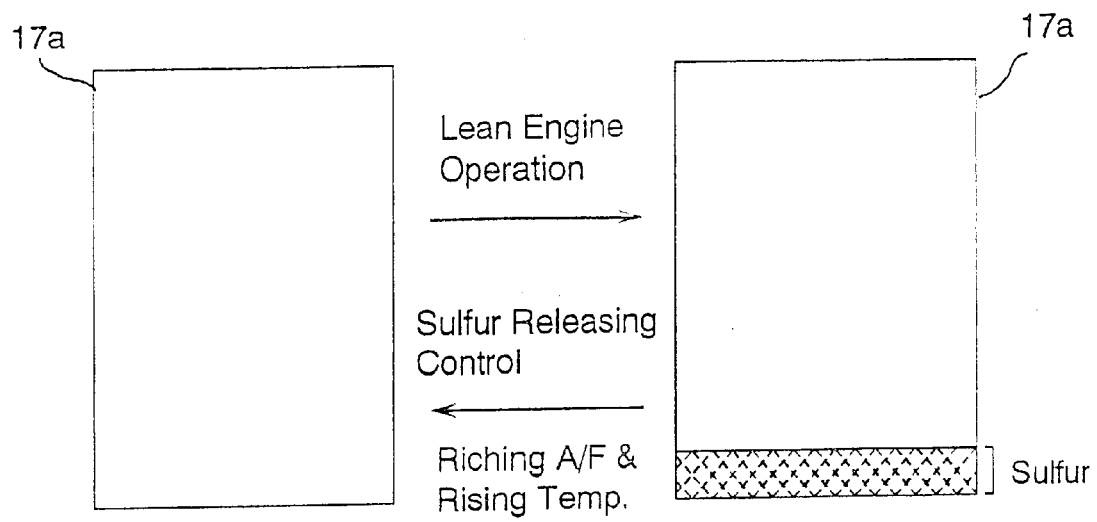
FIG. 8 is a conceptual chart showing a NOx trap material that releases sulfur in sulfur releasing control.

FIG. 8 is a conceptual view showing the sulfur releasing control. As shown, in the sulfur releasing control, when the amount of sulfur absorbed by the NOx trap material 17a increases beyond a specified amount, the NOx trap material 17a is caused to release sulfur by making the air-fuel ratio of an exhaust gas richer and rising a temperature of the exhaust gas, and hence the NOx catalyst 12), so as thereby to recover its NOx absorbing capacity. In this instance, the period for which sulfur releasing is executed in the sulfur releasing control is shorter than the period for which the NOx releasing is executed in the NOx releasing control. The rise in exhaust gas temperature is achieved by retarding an ignition timing. However, since making an air-fuel ratio richer causes deterioration of fuel consumption performance and, in consequence, spoils the fuel consumption performance increasing characteristic of lean burn engine, it is desirable to restrict the degree of enrichment of air-fuel ratio even for the purpose of releasing sulfur from the NOx trap material 17a.

Figure 9A:
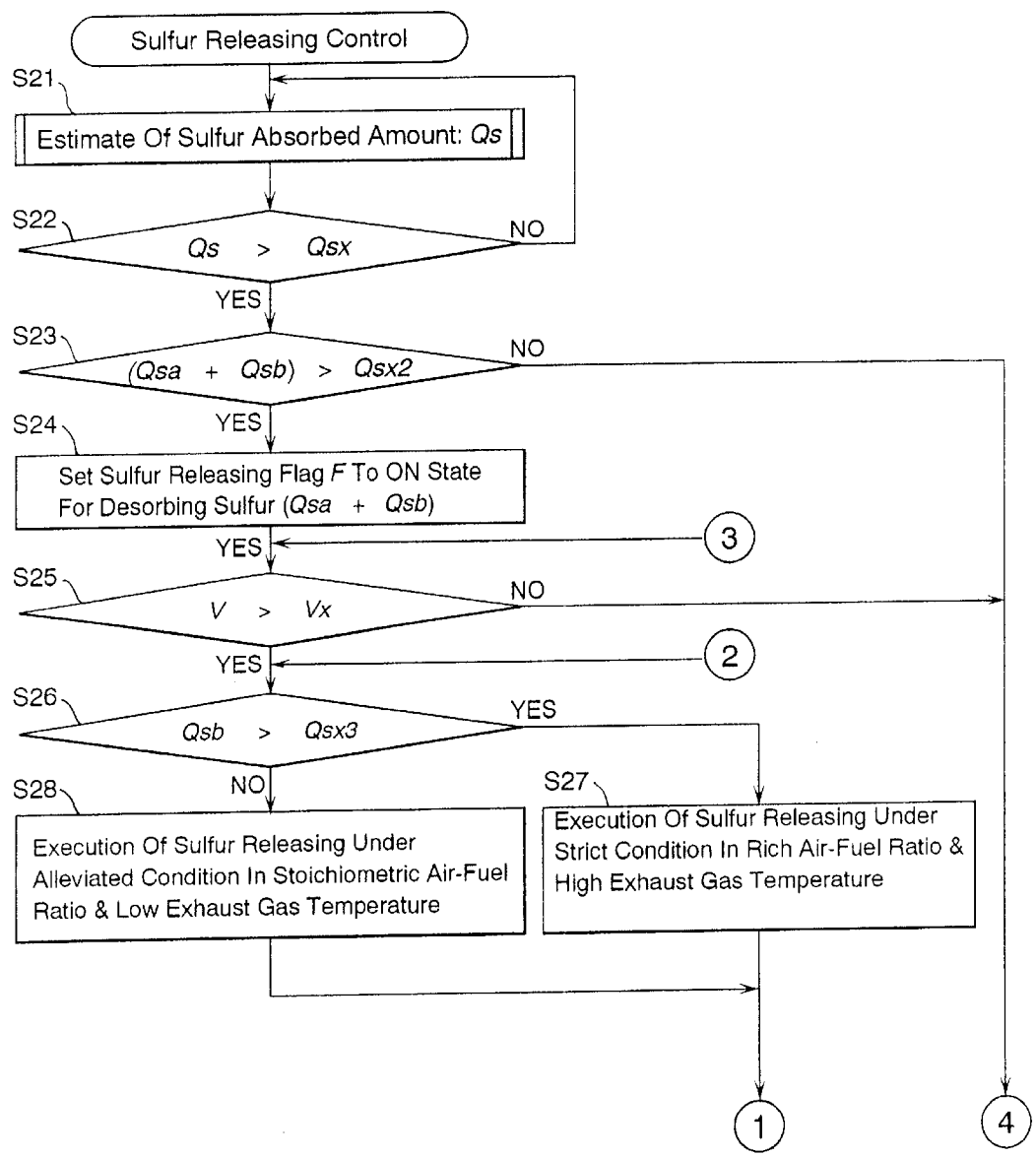
FIGS. 9A and 9B are respective parts of a flowchart illustrating a sequence routine of sulfur releasing control.
Figure 9B:
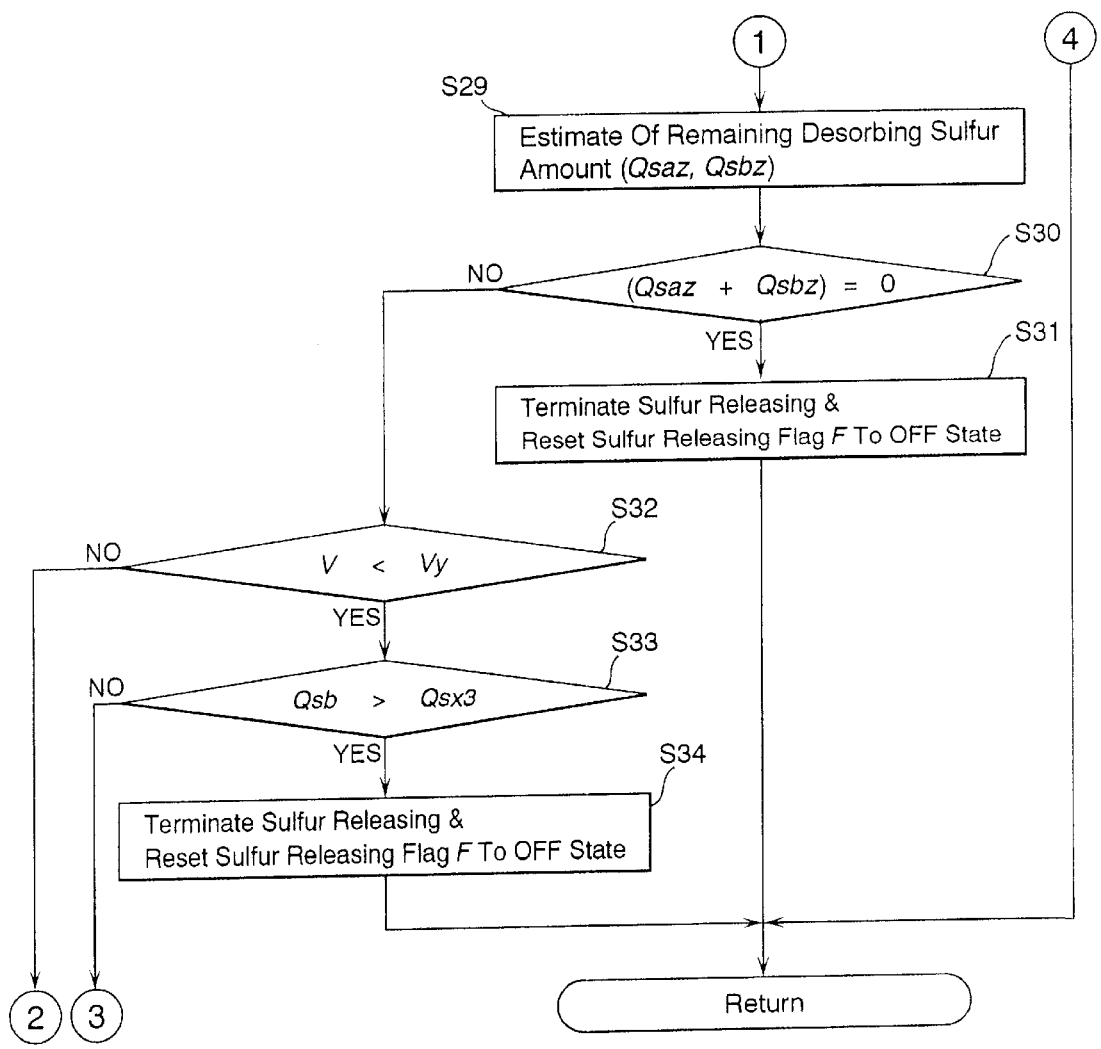

FIGS. 9A and 9B show a flowchart illustrating a main routine of the sulfur releasing control that is continuously repeated at predetermined periods while the NOx trap material is in surroundings for absorbing sulfur. Because, sulfur is released spontaneously from the NOx trap material while an exhaust gas temperature is high in the period of rich engine operation or the period of stoichiometric engine operation, an estimate of an amount of sulfur remaining unreleased or still absorbed in the NOx trap material (which is hereafter referred to as the sulfur remaining amount) is made on the basis of an amount of sulfur released from the NOx trap material in place of the estimate of an amount of absorbed sulfur Qs in the sulfur releasing control. However, because the sulfur releasing that is performed resulting from the NOx releasing control is caused by making an air-fuel ratio richer without rising exhaust gas temperature, sulfur is not released resulting from only NOx releasing. Accordingly, the estimate of an amount of sulfur absorbed by the NOx trap material is continued during the NOx releasing.

When the sequence logic commences and control proceeds to step S21 where an estimate of sulfur absorbed amount Qs is made.

Figure 10:
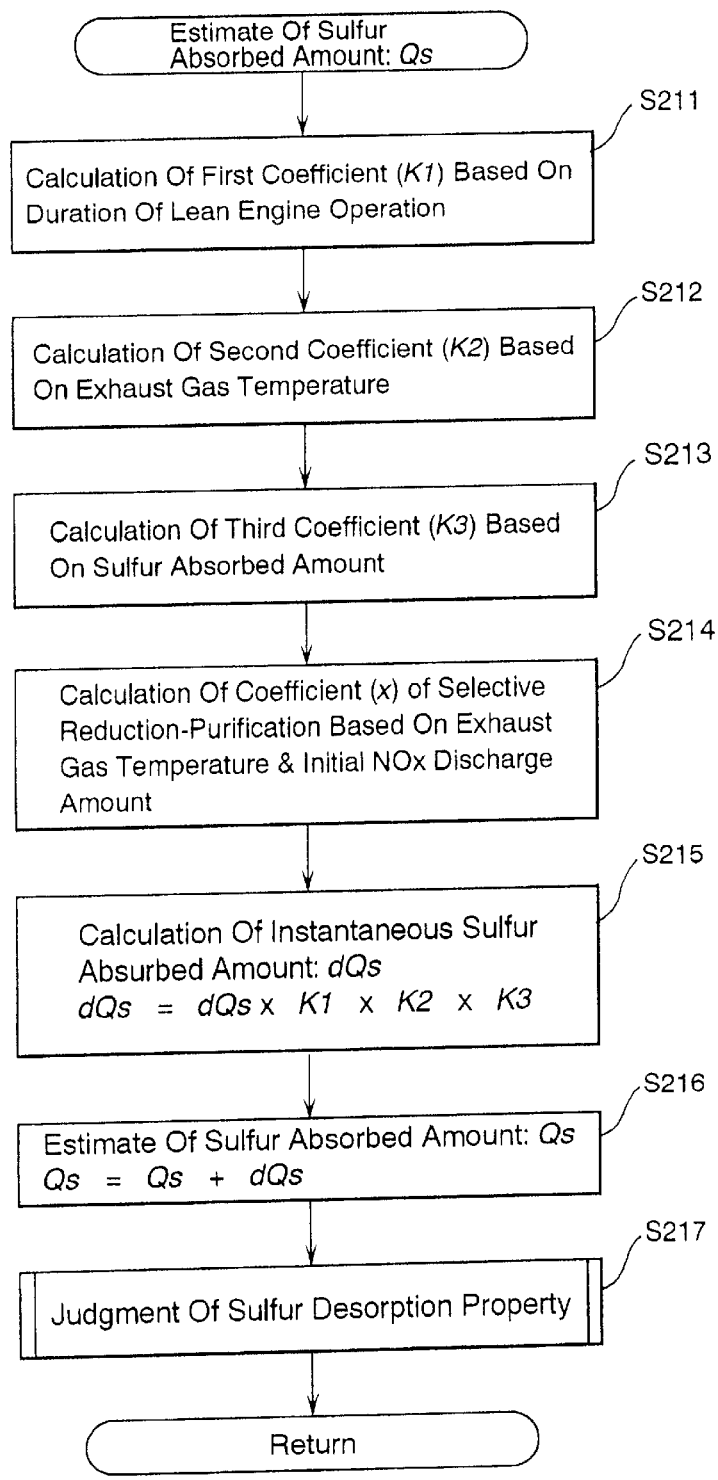
FIG. 10 is a flowchart illustrating a sequence routine of estimating sulfur absorbed amount.

FIG. 10 is a flowchart illustrating a subroutine of the estimate of sulfur absorbed amount Qn. When the sequence logic commences and control proceeds to a block at step S211 where a calculation of a basic instantaneous sulfur absorbed amount dQso is made on the basis of an amount of fuel flow from which sulfur generates. The basic instantaneous sulfur absorbed amount dQso becomes larger with an increase in the amount of fuel flow. Subsequently, calculations of first to third correction coefficients K1, K2 and K3 are made on the basis of a duration of lean engine operation, an exhaust gas temperature and a sulfur absorbed amount Qs (the integrated amount of sulfur that has been absorbed until the last sequence cycle), at steps S212 to S214, respectively. The first correction coefficient K1 takes a maximum value for a specified duration of lean engine operation and becomes smaller as the duration of lean engine operation becomes shorter or longer than the specified duration of lean engine operation.

The first correction coefficient K1 takes a maximum value for a specified duration of lean engine operation and becomes smaller as a duration of lean engine operation becomes shorter or longer than the specified duration of lean engine operation. The second correction coefficient K2 takes a maximum value for a specified exhaust gas temperature and becomes smaller as an exhaust gas temperature becomes lower or higher than the specified exhaust gas temperature. The third correction coefficient K3 takes a maximum value for a specified sulfur absorbed amount Qs and becomes smaller as a sulfur absorbed amount Qs becomes larger than the specified sulfur absorbed amount Qs.

Thereafter, an instantaneous sulfur absorbed amount dQs is calculated by multiplying the basic instantaneous sulfur absorbed amount dQso by the first to third correction coefficients K1, K2 and K3 at step S215, and a sulfur absorbed amount Qs is estimated by adding the sulfur absorbed amount dQs to the previous sulfur absorbed amount Qs at step S216. Subsequently, a subroutine of judging a sulfur desorption type is called for at step S217.

The sulfur absorbed amount Qs thus estimated is the total amount of sulfur that is absorbed by the NOx catalyst 17. However, the sulfur varies widely its property of desorption depending upon surroundings. Specifically, sulfur is put into three types, namely easy-to-desorb sulfur that is easy to desorb, hard-to-desorb sulfur that is hard to desorb and non-desorbing sulfur that can not desorb, contained together. Proportions of these different types of sulfur are not constant. On account of the above, in this embodiment, the sulfur releasing is restricted according to types of sulfur desorption that are judged by analyzing the desorption property of sulfur, so as thereby to prevent the sulfur releasing from being performed more than is necessary.

Figure 11:
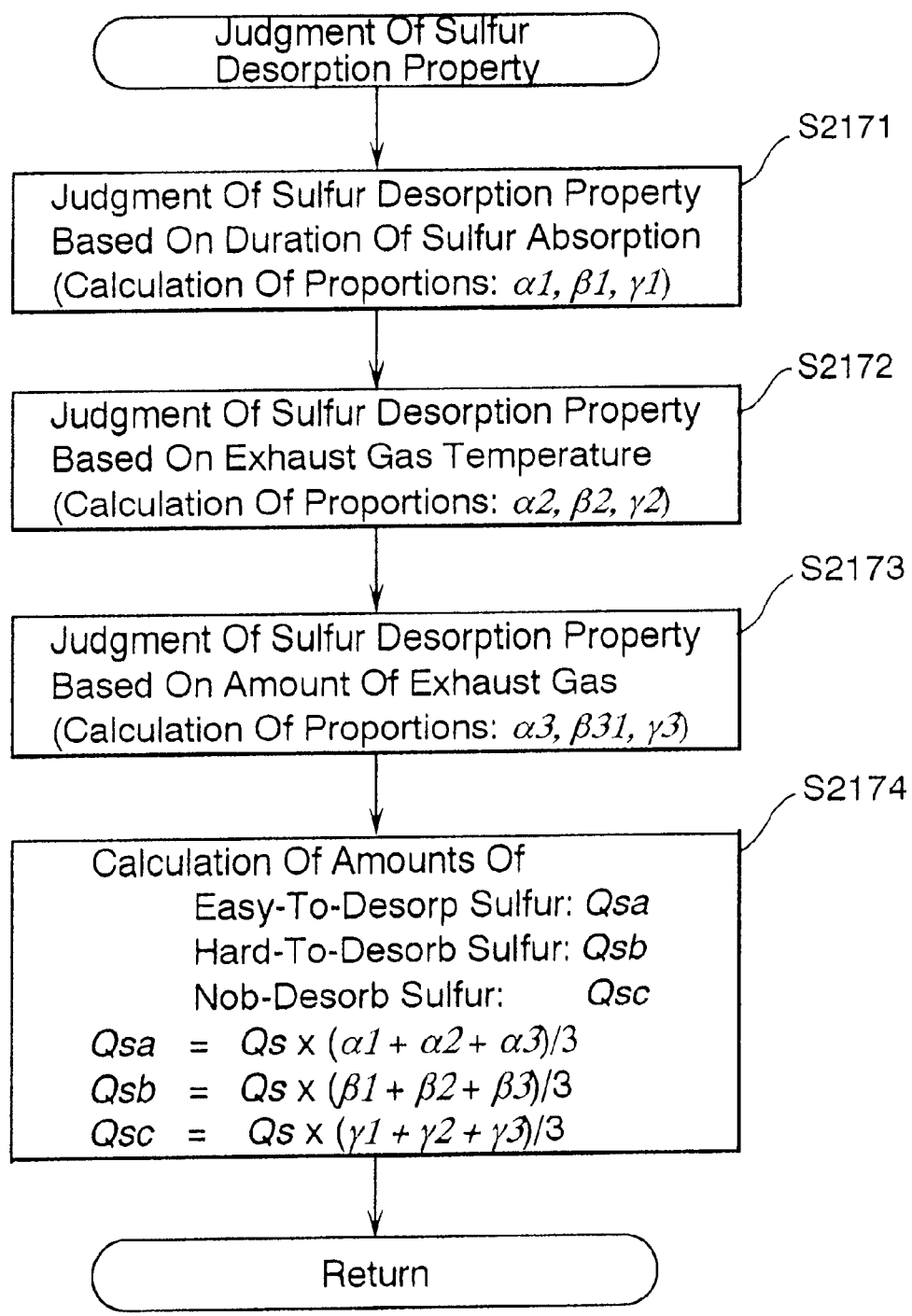
FIG. 11 is a flowchart illustrating a sequence routine of judging sulfur desorption properties.

Referring to FIG. 11 which is a flowchart illustrating the subroutine of judging the type of sulfur desorption, when the sequence logic commences and control proceeds consecutively to blocks at steps S2171 to S2173 where desorption properties of sulfur are judged on the basis of a sulfur absorbing time tim for which sulfur remains absorbed (a lapse of time from a point of time of a termination of the last sulfur releasing), an exhaust gas temperature tmp and an amount of exhaust gas vlm, respectively, in order to calculate proportions of the respective types of sulfur $\alpha$, $\beta$ and $\gamma$ to the sulfur absorbed amount Qs. Specifically, proportions of easy-to-desorb sulfur, hard-to-desorb sulfur and non-desorbing sulfur $\alpha 1$, $\beta 1$ and $\gamma 1$ are calculated on the basis of a sulfur absorbing time tim at step S2171. Proportions of easy-to-desorb sulfur, hard-to-desorb sulfur and non-desorbing sulfur $\alpha 2$, $\beta 2$ and $\gamma 2$ are calculated on the basis of an exhaust gas temperature tmp at step S2172. Proportions of easy-to-desorb sulfur, hard-to-desorb sulfur and non-desorbing sulfur $\alpha 3$, $\beta 3$ and $\gamma 3$ are calculated on the basis of an amount of exhaust gas vlm at step S2173.

Figure 12:
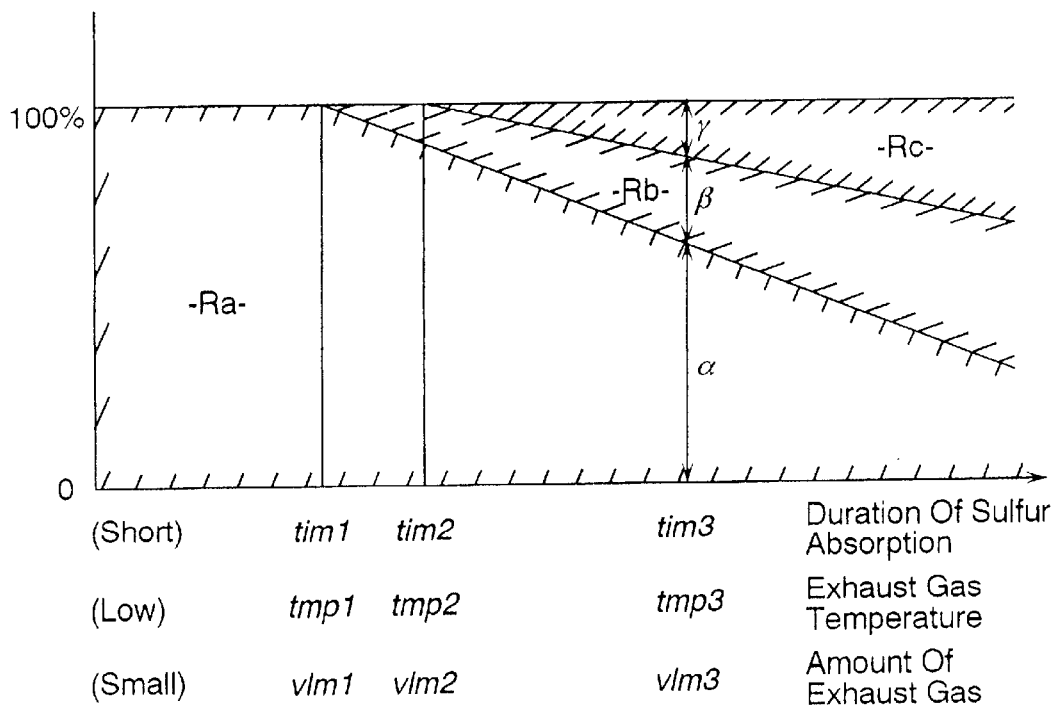
FIG. 12 is a diagram of changes in sulfur desorption property coefficient with respect to parameters.

FIG. 12 shows a characteristic diagram of a change in coefficient of sulfur desorption property. As seen in FIG. 12, the proportion of easy-to-desorb sulfur a decreases with decreases in sulfur absorbing time tim, an exhaust gas temperature tmp and amount of exhaust gas vlm. Conversely, the proportions of hard-to-desorb sulfur and non-desorbing sulfur $\beta$ and $\gamma$ increase with a decrease in at least one of a sulfur absorbing time tim, an exhaust gas temperature tmp and an amount of exhaust gas vlm. A region Ra for easy-to-desorb sulfur is reduced and regions Rb and Rc for hard-to-desorb sulfur and non-desorbing sulfur, respectively, increase.

When sulfur releasing is caused before a lapse of a sulfur absorbing time tim1 from a termination of the last sulfur releasing, 100% of sulfur absorbed by the NOx catalyst 17 easily desorbs. In other words, before a lapse of the sulfur absorbing time tim1, the proportion of easy-to-desorb sulfur $\alpha 1$ is 100%. On the other hand, when sulfur releasing is caused before a lapse of a sulfur absorbing time tim2 but after a lapse of the sulfur absorbing time tim1 from termination of the last sulfur releasing, some part of sulfur absorbed by the NOx catalyst 17 becomes hard-to-desorb ($\beta 1 > 0\%$). When sulfur releasing is caused after a lapse of the sulfur absorbing time tim2, some part of sulfur absorbed by the NOx catalyst 17 does not desorb ($\gamma 1 > 0\%$). This tendency of sulfur desorption results from that sulfur becomes hard to leave from the NOx trap material due to progress of bonding reaction on the texture of NOx trap material with time.

Similarly to the tendency of sulfur desorption depending upon sulfur absorbing time tim, 100% of sulfur that is absorbed at an exhaust temperature tmp lower than tmp1 by the NOx catalyst 17 easily desorbs ($\alpha 2=100\%$). Some part of sulfur that is absorbed at an exhaust temperature tmp between tmp1 and tmp2 becomes hard-to-desorb ($\beta 2>0\%$). Some part of sulfur that is absorbed at an exhaust temperature tmp higher than tmp2 does not desorb ($\gamma 2>0\%$). This tendency of sulfur desorption results from a strong bond of sulfur with NOx trap material due to the progress of bonding reaction of sulfur on the texture of NOx trap material with time. In this instance, the proportions of three types of sulfur $\alpha 2$, $\beta 2$ and $\gamma 2$ may be calculated in consideration of a history of heat that the sulfur received before subsequent sulfur releasing in place of or in addition to an exhaust gas temperature at which the sulfur has been absorbed.

Further, 100% of sulfur that is absorbed when the amount of exhaust gas vlm is less than vlm1 easily desorbs ($\alpha 3=100\%$). Some part of sulfur that is absorbed when the amount of exhaust gas vlm is between vlm1 and vlm2 becomes hard to desorb ($\beta 3>0\%$). Some part of sulfur that is absorbed when the amount of exhaust gas vlm is greater than vlm2 does not desorb ($\gamma 3>0\%$). This tendency of desorption results from a strong bond of sulfur with the NOx trap material due to bonding reaction of sulfur on the texture of NOx trap material with time that progresses more as the amount of exhaust gas during absorbing sulfur, and hence reactive pressure, is larger. The tendency of sulfur desorption results also from that sulfur becomes hard to leave from the NOx trap material due to getting deeply into the texture of NOx trap material. In this instance, the proportions of three types of sulfur $\alpha 3$, $\beta 3$ and $\gamma 3$ may be calculated in consideration of a history of heat that the sulfur received before subsequent sulfur releasing in place of or in addition to an amount of exhaust gas or reactive pressure when the sulfur has been absorbed.

Thereafter, at step S2174, amounts of respective types of sulfur are calculated using the given proportions of respective types of sulfur $\alpha 1-\alpha 3$, $\beta 1-\beta 3$ and $\gamma 1-\gamma 3$. Specifically, the amount of easy-to-desorb sulfur Qsa is calculated by multiplying the sulfur absorbed amount Qs by an arithmetic mean of the proportions of easy-to-desorb sulfur $\alpha 1$, $\alpha 2$ and $\alpha 3$. Similarly, the amount of hard-to-desorb sulfur Qsb is calculated by multiplying the sulfur absorbed amount Qs by an arithmetic mean of the proportions of hard-to-desorb sulfur $\beta 1$, $\beta 2$ and $\beta 3$, and the amount of non-desorbing sulfur Qsc is calculated by multiplying the sulfur absorbed amount Qs by an arithmetic mean of the proportions of hard-to-desorb sulfur $\gamma 1$, $\gamma 2$ and $\gamma 3$. These proportions of respective sulfur types $\alpha 1-\alpha 3$, $\beta 1-\beta 3$ or $\gamma 1-\gamma 3$ may be differently weighted.

When amounts of respective types of sulfur are calculated, then, the final step orders return to the main routine, after the step in the main routine calling for the sulfur absorbed amount estimate subroutine.

Referring back to FIG. 9A, after waiting till the sulfur absorbed amount Qs reaches a specified amount Qs at step S22, a judgment is made at step S23 as to whether an amount of desorbing sulfur that can desorb easily or hardly, namely a total amount of easy-to-desorb sulfur and hard-to-desorb sulfur (Qsa+Qsb), is greater than a second effective judging value Qsx2 (see FIG. 13) for execution of sulfur releasing. This judgment is made in order to examine beforehand that sulfur releasing is not useless but significantly effective because the amount non-desorbing sulfur Qsc is quite a little. Only when the total amount of desorbing sulfur (Qsa+Qsb) is greater than the second effective judging value Qsx2, a sulfur releasing flag F is set up or turned to a state of ON aiming at releasing the desorbing sulfur at step S24. On the other hand, when the total amount of desorbing sulfur (Qsa+Qsb) is less than the second effective judging value Qsx2, the sequence logic orders return so as to restrict the sulfur releasing. That is, sulfur releasing is prevented from being executed aiming at releasing the non-desorbing sulfur. In consequence, it is avoided to cause making an air-fuel ratio richer and rising an exhaust gas temperature uselessly. This inhibits an occurrence of the problem of deterioration of fuel consumption performance and a drop in engine output torque due to a retardation of ignition timing. In this instance, since there is almost no possibility that the non-desorbing sulfur changes in property into desorbing sulfur, easily or hardly, when the amount of desorbing sulfur is judged negative once at step S23, the sequence logic does not proceeds to the subsequent steps in future, so as to prevent sulfur releasing from continuing for a long time.

Subsequently to setting up the sulfur releasing flag F at step S24, a judgment is made at step S25 as to whether a vehicle speed V is higher than a judging value Vx for execution of sulfur releasing. This judgment is made in order to examine beforehand an occurrence of the possibility that an exhaust gas temperature does not rise to an effective temperature for execution of sulfur releasing, that is, for example, 550° C. and 600° C., even how trying to retard an ignition timing so as to cause a rise in exhaust gas temperature in an event where the exhaust gas temperature does not rise sufficiently due to a low vehicle speed. Only when a vehicle speed V is higher than the judging value Vx, sulfur releasing is executed through the subsequent steps S26 to S34.

On the other ahnd, when a vehicle speed V is lower than the judging value Vx, the sequence logic orders return so as to restrict the sulfur releasing. In consequence, it is avoided to cause making an air-fuel ratio richer and rising an exhaust gas temperature uselessly, so as to inhibit an occurrence of the problem of deterioration of fuel consumption performance and a drop in engine output torque due to a retardation of ignition timing. That is, when the vehicle is showing a strong tendency to run at a low speed, the sequence logic does not proceeds to the subsequent steps in future, so as to prevent sulfur releasing from continuing for a long time.

Before a start of sulfur releasing, a judgment is made at step S26 as to whether the amount of hard-to-desorb sulfur Qsb is greater than a condition judging value Qsx3 (see FIG. 13) for determining a condition for executing sulfur releasing. When the amount of hard-to-desorb sulfur Qsb is greater than the condition judging value Qsx3, sulfur releasing is executed under a strict condition at step S27. On the other hand, when the amount of hard-to-desorb sulfur Qsb is less than the condition judging value Qsx3, sulfur releasing is executed under an alleviated condition at step S28. Specifically, although sulfur releasing is performed by making an air-fuel ratio richer and rising an exhaust gas temperature, the sulfur releasing is executed by making an air-fuel ratio as rich as, for example, entering the rich operation region B1 and rising an exhaust gas temperature as high as possible to, for example, 600° C. when a proportion of the amount of hard-to-desob sulfur Qsb relative to the total amount of desorbing sulfur (Qsa+Qsb) is greater than a proportion of the other and, on the other hand, the sulfur releasing is executed by making an air-fuel ratio as lean as, for example, entering the stoichiometric operation region B2 and moderately rising an exhaust gas temperature to, for example, 550° C. when the proportion of the amount of hard-to-desob sulfur Qsb relative to the total amount of desorbing sulfur (Qsa+Qsb) is smaller than the proportion of the other. This prevents an air-fuel ratio from being made richer in excess and an exhaust gas temperature from being risen too high. This inhibits an occurrence of the problem of deterioration of fuel consumption performance and a drop in engine output torque due to a retardation of ignition timing.

In either event, during the sulfur releasing, an estimate is made to determine amounts of remaining absorbed sulfur, namely an amount of easy-to-desorb sulfur Qsaz that remains unreleased or still absorbed in the NOx trap material and an amount of hard-to-desorb sulfur Qsbz that remains unreleased or still absorbed in the NOx trap material, at step S29. This estimate of the amounts of respective remaining absorbing sulfur Qsaz and Qsbz is performed on the basis of sulfur releasing conditions (air-fuel ratio and exhaust gas temperature), an execution time of fuel releasing and the like. Subsequently, a judgment is made at step S30 as to whether a total amount of remaining absorbing sulfur (Qsaz+Qsbz) is zero. When the total amount of remaining absorbing sulfur (Qsaz+Qsbz) is zero, the sulfur releasing is terminated and the sulfur releasing flag F is reset down or to a state of OFF at step S31. That is, the lean engine operation is restored by stop ping making an air-fuel ratio richer and a rise in exhaust gas temperature is terminated by stopping retarding an ignition timing. After resetting the sulfur releasing flag F to the state of OFF at step S31, the sequence logic orders return and calls for the subroutine of the estimate of sulfur absorbed amount Qn.

Otherwise, whenever a vehicle speed V is higher than a judging value Vy (see FIG. 13) at step S32, this indicates that a vehicle sped V is sufficiently high to cause a rise in exhaust gas temperature effective in releasing sulfur, the sulfur releasing is temporarily interrupted and resumed at step S27 or S28 until the total amount of remaining absorbing sulfur (Qsaz+Qsbz) becomes zero. Further, when the total amount of remaining absorbing sulfur (Qsaz+Qsbz) is greater than a judging value Qsx4 (see FIG. 13) for resetting the sulfur releasing flag F at step S33 even while the vehicle speed V is lower than the judging value Vy at step S32, the sulfur releasing is temporarily interrupted and resumed at step S27 or S28 until the total amount of remaining absorbing sulfur (Qsaz+Qsbz) becomes zero when the judging speed Vx is reached at step S25. However, when the total amount of remaining absorbing sulfur (Qsaz+Qsbz) is smaller than the judging value Qsx4 at step S33 even while the vehicle speed V is lower than the judging value Vy at step S32, the sulfur releasing is terminated and the sulfur releasing flag F is reset to the state of OFF at step S34. After resetting the sulfur releasing flag F to the state of OFF at step S34, the sequence logic orders return and calls for the subroutine of the estimate of sulfur absorbed amount Qn.

Figure 13:
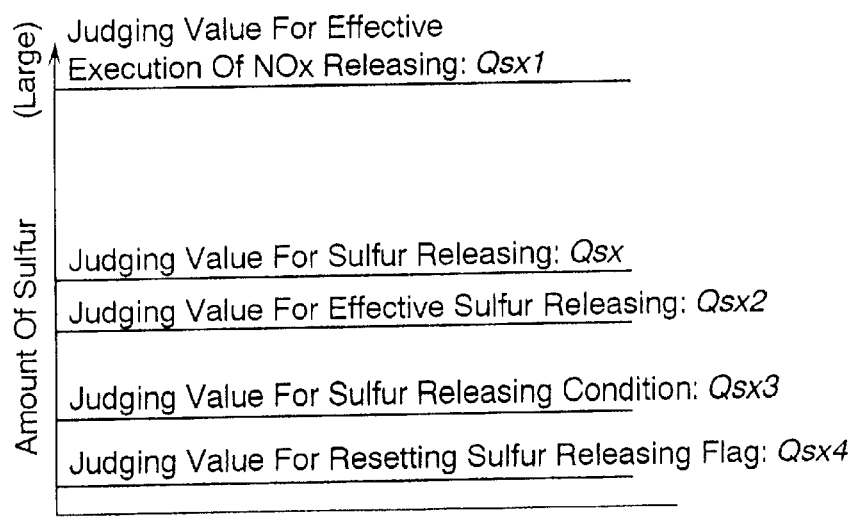
FIG. 13 is a chart of judging values that are used in the NOx releasing control and the sulfur releasing control.
Figure 14:
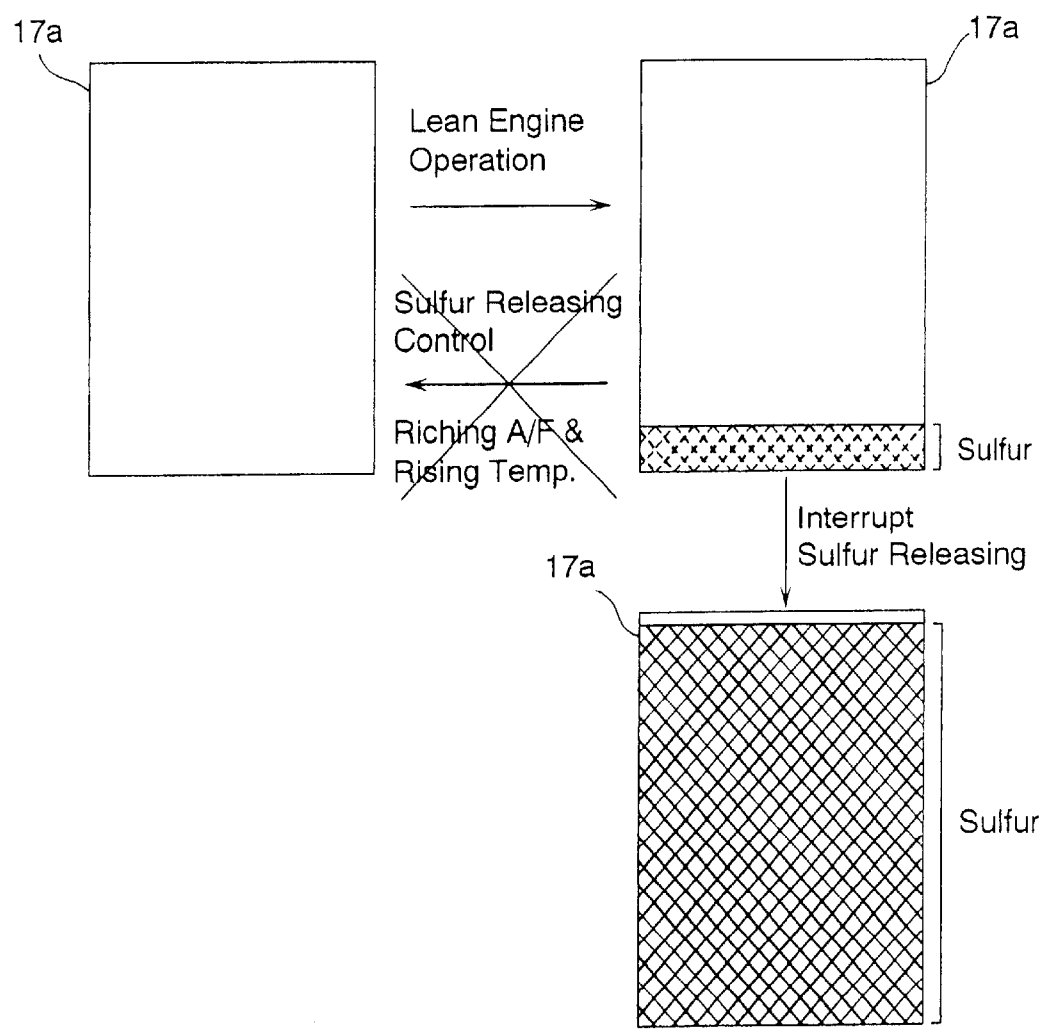
FIG. 14 is a conceptual chart showing a NOx trap material after progress of sulfur absorption resulting from restriction of the sulfur releasing control.

As described above, when a total amount of desorbing sulfur (Qsaz+Qsbz) is smaller than the second effective judging value Qsx2 for execution of sulfur releasing at step S23 or when a vehicle speed V is higher than the judging value Vx for execution of sulfur releasing at step S25 (including an event of temporarily restriction of sulfur releasing), sulfur releasing is postponed or restricted. As a result, as shown in FIG. 14, the progress in absorbing sulfur makes it almost hardly expectable that the NOx trap material absorbs NOx. Accordingly, it is found out whether the NOx trap material 17a is in such the state by making the judgment regarding a sulfur absorbed amount Qs with respect to the first effective judging value Qsx1 made at step S3 in the NOx releasing control shown in FIG. 3. Specifically, when a sulfur absorbed amount Qs is judged to be larger than the first effective judging value Qsx1 (that is set to a considerably larger value as shown in FIG. 13) at step S3, the NOx trap material 17a has significantly lowered its NOx absorbing capacity and absorbs only quite a little amount of NOx as shown by an illustration (I) in FIG. 15. Accordingly, even when an integrated NOx absorbed amount Qn has been estimate to be greater than that the judging value Qnx for execution of NOx releasing at step S2, the sequence logic does not proceeds to step S4 so as thereby to restrict NOx releasing.

Figure 15:
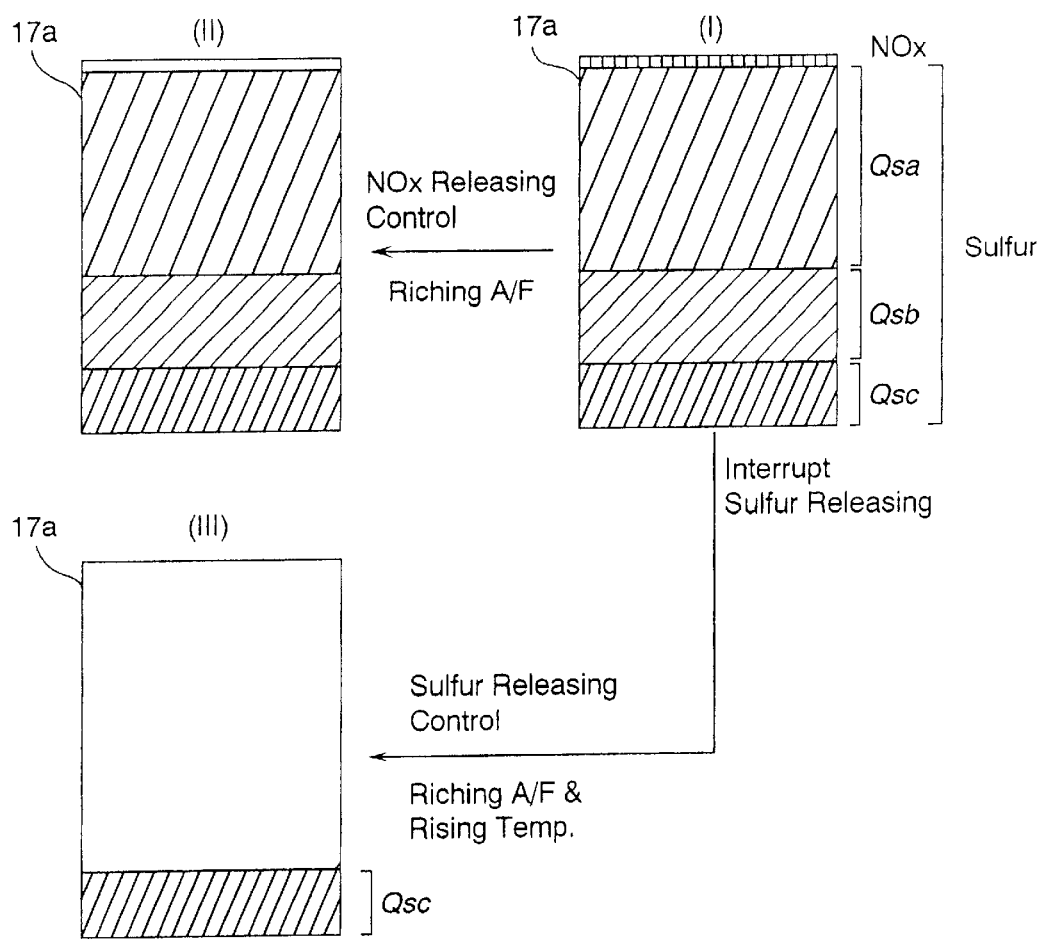
FIG. 15 is a conceptual chart showing a comparison of the NOx trap material having absorbed sulfur between when releasing NOx and when releasing sulfur.

Even if making an air-fuel ratio richer in this state, sulfur is not released by only making an air-fuel ratio richer, so that the NOx trap material 17a can release only a small amount of NOx as shown by an illustration (II) in FIG. 15. The NOx trap material 17a can not be expected to absorb NOx satisfactorily ever since, so that it is useless to make an air-fuel ratio richer. Accordingly, the judgment concerning a sulfur absorbed amount Qs relative to the first effective judging value Qsx1 made at step S3 avoids a useless change of air-fuel ratio, so as thereby to inhibit an occurrence of the problem of deterioration of fuel consumption performance.

When it is judged that an sulfur absorbed amount Qs is larger than the first effective judging value Qsx1 at step S3, the sequence logic proceeds to step S9 to change the lean operation region A to the reduced lean operation region A' for lower engine speeds and lower engine loads. As a result, the lean engine operation itself that produces a large amount of NOx is restricted, so that the release of NOx into the atmosphere is fundamentally kept down upon an occurrence of a decline in the NOx absorbing capacity of the NOx absorbing material 17a. However, in such an event, since the lean engine operation is allowed in the selective reduction-purification region D, the decline in the NOx absorbing capacity of the NOx absorbing material 17a due to the change to the reduced lean operation region A' is restrained while a level of NOx emission to the atmosphere is lowered.

The restriction of lean engine operation terminates when the sulfur absorbed amount Qs is judged to be larger than the first effective judging value Qsx1 at step S3, in other words, when the sulfur absorbed amount Qs will reduce sufficiently for the NOx trap material 17a to recover its NOx absorbing capacity resulting from resumption of sulfur releasing. However, in this embodiment, the sulfur releasing is restricted to the event where an amount of non-desorbing sulfur Qsc is comparatively large, i.e. where an amount of desorbing sulfur (Qsa+Qsb) is smaller than the judging value Qsx2 or the event where a vehicle speed is comparatively low. While there is a possible chance for vehicle speed to increase, there is no chance for the non-desorbing sulfur to turn capable of desorbing since the desorption property of sulfur deteriorates with time. That is, it is almost impossible to resume sulfur releasing in the future. Accordingly, in this embodiment, when an amount of desorbing sulfur (Qsa+Qsb) is smaller than the effective judging value Qsx2 at step S23, the restriction of sulfur releasing lasts for a comparatively long time. This avoids the possibility that the amount of desorbing sulfur (Qsa+Qsb) becomes large beyond the judging value Qsx2 at step S23 and, in consequence, there is less chance of execution of NOx releasing.

Further, as described above, since the sulfur releasing is executed under a restrict condition at step S27 or under an alleviated condition at step S28 according to a result of the judgment concerning sulfur desorption property made at step S217 in the subroutine of estimating a sulfur absorbed amount Qn, the sulfur releasing is executed properly and effectively. This inhibits an occurrence of the problem of deterioration of fuel consumption performance and a drop in engine output torque. Furthermore, as shown by an illustration (III) in FIG. 15, non-desorbing sulfur is excluded from the target of sulfur releasing at step S30, the sulfur releasing is executed with significantly high rationality.

In the above embodiment, the condition for execution of sulfur releasing may be regulated strictly or alleviated by changing both or either one of air-fuel ratio and exhaust gas temperature are. Since it is possible to provide various patterns of sulfur releasing conditions for restriction and alleviation, the sulfur releasing control can be performed precisely according to sulfur desorption properties.

The present invention has been described with reference to preferred embodiments thereof. However, it will be appreciated that variants and other embodiments can be effected by person of ordinary skill in the art without departing from the scope of the invention.

What is claimed is:

1. An exhaust gas purifying apparatus for purifying exhaust gases generated by an internal combustion engine, said exhaust gas purifying apparatus comprising:

a NOx trap material disposed in an exhaust gas passage to absorb NOx while an air-fuel ratio of an exhaust gas is leaner than a stoichiometric air-fuel ratio and release NOx while an air-fuel ratio of an exhaust gas is richer than said stoichiometric air-fuel ratio; and control means for estimating an amount of NOx absorbed by said NOx trap material, for making an air-fuel ratio richer so as thereby to cause said NOx trap material to release NOx when said amount of NOx absorbed by said NOx trap material is greater than a specified amount, for estimating an amount of sulfur absorbed by said NOx trap material, and for making an air-fuel ratio richer and rising an exhaust gas temperature so as thereby to cause said NOx trap material to perform sulfur releasing when said amount of sulfur absorbed by said NOx trap material is greater than a first specified amount;

wherein said control means conditionally restricts said sulfur releasing of said NOx trap material and restrains said air-fuel ratio from being made richer when said amount of sulfur absorbed by said NOx trap material is larger than a second specified amount that is larger than said first specified amount.

2. An exhaust gas purifying apparatus as defined in claim 1, further comprising speed detection means for detecting an engine speed, load detection means for detecting an engine load, and memory means for storing a characteristic of target air-fuel ratio with respect to engine speed and engine load, wherein said control means controls an air-fuel ratio so as to reach a target air-fuel ratio defined by said characteristic of target air-fuel ratio on the basis of said engine speed detected by said speed detection means and said engine load detected by said load detection means, and changing said characteristic of target air-fuel ratio so as to reduce an occasion for said engine to operate with an air-fuel ratio leaner than a stoichiometric air-fuel ratio when said amount of sulfur absorbed by said NOx trap material is larger than a second specified amount that is larger than said first specified amount.

3. An exhaust gas purifying apparatus as defined in claim 2, wherein said characteristic of target air-fuel ratio comprises a first engine operation region for engine operation in an air-fuel ratio leaner than said stoichiometric air-fuel ratio, a second engine operation region for engine operation in said stoichiometric air-fuel ratio and a third engine operation region for engine operation in an air-fuel ratio richer than said stoichiometric air-fuel ratio, and said control means reduces said first engine operation region when said amount of sulfur absorbed by said NOx trap material is larger than a second specified amount that is larger than said first specified amount.

4. An exhaust gas purifying apparatus as defined in claim 3, wherein said first engine operation region after having been reduced includes a fourth engine operation region where said NOx trap material performs selective reduction-purification of NOx.

5. An exhaust gas purifying apparatus as defined in claim 4, wherein said fourth engine operation region is a region of engine speed and engine load lower than specified engine speed and engine load, respectively, where an exhaust gas temperature becomes comparatively low.

6. An exhaust gas purifying apparatus as defined in claim 1, wherein said control means makes a retardation of ignition timing so as thereby to rise said exhaust gas temperature and restricts said retardation of ignition timing while said engine is in an operating state where said exhaust gas temperature does not rise to a temperature effective on causing said sulfur releasing even when making said retardation of ignition timing.

7. An exhaust gas purifying apparatus as defined in claim 1, wherein said control means judges desorption properties of said sulfur absorbed by said NOx trap material, estimates amounts of said sulfur absorbed by said NOx trap material for said desorption properties and restricts said sulfur releasing when an amount of non-desorbing sulfur is larger than a specified amount.

8. An exhaust gas purifying apparatus as defined in claim 7, wherein said control means judges said desorption properties on the basis of at least one of a sulfur absorbing time for which sulfur remains absorbed, an exhaust gas temperature and an amount of exhaust gas.

9. An exhaust gas purifying apparatus as defined in claim 8, wherein said control means estimates an amount of said non-desorbing sulfur to be larger as said sulfur absorbing time becomes longer.

10. An exhaust gas purifying apparatus as defined in claim 8, wherein said control means estimates an amount of said non-desorbing sulfur to be larger as said exhaust gas temperature becomes higher.

11. An exhaust gas purifying apparatus as defined in claim 8, wherein said control means estimates an amount of said non-desorbing sulfur to be larger as said amount of exhaust gas becomes larger.

12. An exhaust gas purifying apparatus as defined in claim 1, and further comprising alarm means for providing a driver with an alarm indicating deterioration of said NOx trap material when said amount of sulfur absorbed by said NOx trap material becomes larger than a second specified amount that is larger than said first specified amount.

13. An exhaust gas purifying apparatus for purifying exhaust gases generated by an internal combustion engine, said exhaust gas purifying apparatus comprising:

a NOx trap material disposed in an exhaust gas passage to absorb NOx while an air-fuel ratio of an exhaust gas is leaner than a stoichiometric air-fuel ratio and release NOx while an air-fuel ratio of an exhaust gas is richer than said stoichiometric air-fuel ratio; and control means for estimating an amount of NOx absorbed by said NOx trap material, for making an air-fuel ratio richer so as thereby to cause said NOx trap material to release NOx when said NOx trap material is judged on the basis of said amount of NOx absorbed by said NOx trap material to be lower in NOx absorbing capacity than a specified value, for estimating an amount of sulfur absorbed by said NOx trap material, and for making an air-fuel ratio richer and rising an exhaust gas temperature so as thereby to cause said NOx trap material to perform sulfur releasing when said amount of sulfur absorbed by said NOx trap material is greater than a first specified amount;

wherein said control means conditionally restricts said sulfur releasing of said NOx trap material and restrains said air-fuel ratio from being made richer when said amount of sulfur absorbed by said NOx trap material is larger than a second specified amount that is larger than said first specified amount.

14. An exhaust gas purifying apparatus having a NOx trap material disposed in an exhaust gas passage for absorbing NOx while an air-fuel ratio of an exhaust gas is leaner than a stoichiometric air-fuel ratio and release NOx while an air-fuel ratio of an exhaust gas is richer than said stoichiometric air-fuel ratio so as thereby to purify exhaust gases generated by an internal combustion engine, said exhaust gas purifying apparatus comprising:

a speed sensor operative to detect an engine speed;

an airflow sensor operative to detect an amount of intake air introduced into said engine;

an oxygen sensor disposed in said exhaust gas passage upstream from said NOx trap material so as to detect a concentration of oxygen in exhaust gas; and a control unit operative to control a fuel injector and an ignition plug according to said engine speed, said amount of intake air and said concentration of oxygen in exhaust gas;

wherein said control unit has a target air-fuel ratio control map that defines a first engine operation region for engine operation in an air-fuel ratio at least leaner than a stoichiometric air-fuel ratio, a second engine operation region for engine operation in said stoichiometric air-fuel ratio and a third engine operation region for engine operation in an air-fuel ratio richer than said stoichiometric air-fuel ratio, using engine speed and engine load as parameters so as to control said fuel injector using said target air-fuel ratio map according to said engine speed and said amount of intake air; and wherein said control unit estimates an amount of NOx absorbed by said NOx trap material while said engine operates in said first engine operation region, estimates an amount of sulfur absorbed by said NOx trap material on the basis of a period of time for which said engine operates in said first engine operation region, retarding an ignition timing of said ignition plug so as thereby to rise a temperature of said exhaust gas when the condition for releasing sulfur that said engine speed and said amount of intake air are lower than specified values, respectively while said amount of sulfur is greater than a first specified amount is not satisfied or when an amount of hard-to-desorb sulfur is less than a specified amount while said amount of sulfur is greater than said first specified amount, and controls said fuel injector so as to bring an air-fuel ratio to said stoichiometric air-fuel ratio on condition that said amount of sulfur is less than a second specified amount greater than said first specified amount while said amount of NOx is greater than a specified amount of NOx.

* * * * *